United States Patent
Hao et al.

(10) Patent No.: US 12,413,275 B2
(45) Date of Patent: Sep. 9, 2025

(54) METHODS FOR PMI, RI AND PORT INDEXING OF CSI FOR MULTIPLE TRANSMITTER RECEIVER POINTS

(71) Applicant: QUALCOMM Incorporated, San Diego, CA (US)

(72) Inventors: Chenxi Hao, Beijing (CN); Mostafa Khoshnevisan, San Diego, CA (US); Yu Zhang, San Diego, CA (US); Peter Gaal, San Diego, CA (US); Jing Sun, San Diego, CA (US); Tao Luo, San Diego, CA (US); Xiaoxia Zhang, San Diego, CA (US); Juan Montojo, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/246,642

(22) PCT Filed: Nov. 3, 2020

(86) PCT No.: PCT/CN2020/126103
§ 371 (c)(1),
(2) Date: Mar. 24, 2023

(87) PCT Pub. No.: WO2022/094749
PCT Pub. Date: May 12, 2022

(65) Prior Publication Data
US 2023/0370129 A1    Nov. 16, 2023

(51) Int. Cl.
*H04B 7/06* (2006.01)
*H04B 7/0456* (2017.01)
(Continued)

(52) U.S. Cl.
CPC ......... *H04B 7/0478* (2013.01); *H04B 7/0626* (2013.01); *H04B 7/0639* (2013.01); *H04L 5/005* (2013.01); *H04W 72/0453* (2013.01)

(58) Field of Classification Search
CPC .... H04B 7/0626; H04B 7/0639; H04B 7/024; H04B 7/066; H04B 7/0456; H04B 7/063;
(Continued)

(56) References Cited

U.S. PATENT DOCUMENTS

2019/0020398 A1* 1/2019 Jöngren ................ H04W 24/02
2019/0319689 A1* 10/2019 Wu ........................ H04B 7/066
(Continued)

FOREIGN PATENT DOCUMENTS

CN    111213325 A    5/2020
JP    2020523885 A    8/2020
(Continued)

OTHER PUBLICATIONS

Supplementary European Search Report—EP20960212—Search Authority—Munich—Jul. 10, 2024.
(Continued)

*Primary Examiner* — Nimesh Patel

(57) ABSTRACT

Aspects of the present disclosure provide techniques for channel state information (CSI) reporting in multiple transmitter receiver point (mTRP) scenarios.

30 Claims, 18 Drawing Sheets

(51) Int. Cl.
*H04L 5/00* (2006.01)
*H04W 72/0453* (2023.01)

(58) Field of Classification Search
CPC .. H04B 7/0632; H04B 7/0695; H04B 7/0617; H04B 7/0452; H04B 7/0413; H04B 7/0404; H04B 7/0486; H04B 7/0479; H04B 7/065; H04B 7/0663; H04B 7/0691; H04B 7/2043; H04B 17/309; H04B 7/00; H04B 7/048; H04B 7/068; H04B 7/0682; H04B 7/06956; H04B 7/06966; H04B 7/0697; H04B 7/088; H04B 7/2621; H04B 7/0478; H04B 7/0634; H04B 7/043; H04B 7/0615; H04B 7/0408; H04B 7/08; H04B 17/345; H04L 5/005; H04L 5/0023; H04L 5/0057; H04L 5/0044; H04L 5/0007; H04L 1/0026; H04L 5/0055; H04L 5/0091; H04L 1/1896; H04L 1/0606; H04L 5/001; H04L 27/26; H04L 5/0082; H04L 1/0025; H04L 1/0643; H04L 1/1614; H04L 27/2601; H04L 27/261; H04L 5/0014; H04L 1/0077; H04L 27/2657; H04L 27/2675; H04L 27/2691; H04L 27/2695; H04L 41/0686; H04L 5/0025; H04L 5/003; H04L 5/006; H04L 5/0053; H04L 5/0048; H04L 5/0094; H04L 27/2613; H04L 1/0618; H04L 1/0675; H04L 1/1664; H04L 1/1685; H04L 65/611; H04L 65/80; H04L 27/26132; H04L 1/0027; H04L 1/0031; H04L 5/0005; H04L 5/0026; H04L 5/0035; H04L 25/0254; H04L 1/0668; H04W 72/0453; H04W 24/10; H04W 72/21; H04W 72/23; H04W 72/0446; H04W 72/232; H04W 24/08; H04W 72/04; H04W 72/20; H04W 72/541; H04W 64/00; H04W 72/044; H04W 76/16; H04W 88/06; H04W 16/28; H04W 52/42; H04W 72/046; H04W 72/542; H04W 74/002; H04W 28/082; H04W 28/0958; H04W 36/28; H04W 72/563; H04W 84/12; H04W 88/02; H04W 72/231; H04W 52/24; H04W 72/30; H04W 80/02; H04W 72/535; H04J 13/004; H04J 13/18; H04J 11/0086; H04J 11/005; H04J 11/0056; H04J 11/0023; H04J 11/0053; Y02D 30/70; G01S 1/0428; G01S 5/0036; G01S 5/0072; G01S 5/02; G01S 5/0289; G01S 5/0205; G06N 3/045; G06N 3/08; G06N 3/0464; G06N 3/092

See application file for complete search history.

(56) References Cited

U.S. PATENT DOCUMENTS

| 2020/0204239 | A1* | 6/2020 | Kang | H04B 7/0626 |
|---|---|---|---|---|
| 2020/0336259 | A1 | 10/2020 | Kakishima et al. | |
| 2021/0328742 | A1* | 10/2021 | Hao | H04L 5/0057 |
| 2023/0198594 | A1* | 6/2023 | Kim | H04L 5/0057 |
| | | | | 370/252 |

FOREIGN PATENT DOCUMENTS

| WO | 2018229078 A1 | 12/2018 |
|---|---|---|
| WO | 2019241912 A1 | 12/2019 |
| WO | 2020051896 | 3/2020 |
| WO | 2020122580 A1 | 6/2020 |

OTHER PUBLICATIONS

Huawei, et al., "Discussion Summary for CSI Enhancements MTRP and FR1 FDD Reciprocity", 3GPP TSG RAN WG1 Meeting #102-e, R1-2006973, E-meeting, Aug. 17, 2020-Aug. 28, 2020, 35 Pages, Aug. 28, 2020 (Aug. 28, 2020), the whole document.

Huawei, et al., "Technical Categorization for CSI Enhancements MTRP and FR1 FDD Reciprocity", 3GPP TSG RAN WG1 Meeting #102-e, R1-2007268, E-meeting, Aug. 17, 2020-Aug. 28, 2020, 17 Pages, Aug. 28, 2020 (Aug. 28, 2020) the whole document.

Huawei, et al., "Technical Categorization for CSI Enhancements MTRP and FR1 FDD Reciprocity", 3GPP TSG RAN WG1 Meeting #102-e, R1-200abcd, E-meeting, Aug. 17, 2020-Aug. 28, 2020, 9 Pages, Aug. 28, 2020 (Aug. 28, 2020) section 2.2.

International Search Report and Written Opinion—PCT/CN2020/126103—ISA/EPO—Jul. 30, 2021.

Qualcomm Incorporated: "CSI Enhancements: MTRP and FR1 FDD Reciprocity", 3GPP TSG RAN WG1 #102-e, R1-2006796, e-Meeting, Aug. 17, 2020-Aug. 28, 2020, pp. 1-11, Aug. 28, 2020 (Aug. 28, 2020), the whole document.

* cited by examiner

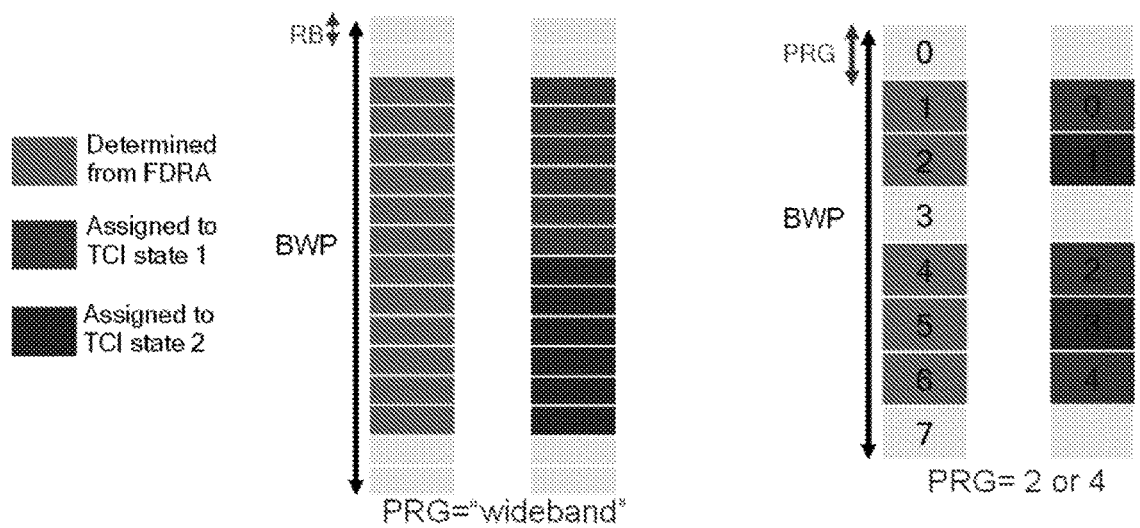
FIG. 8
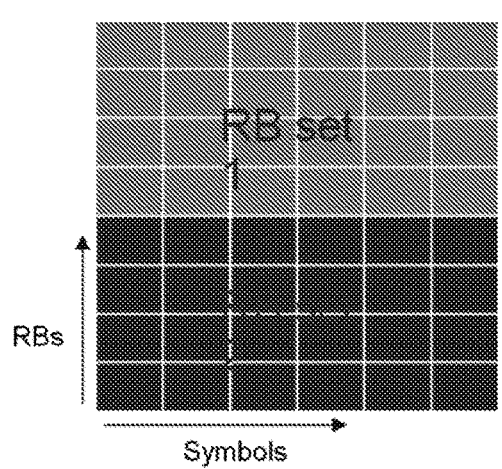
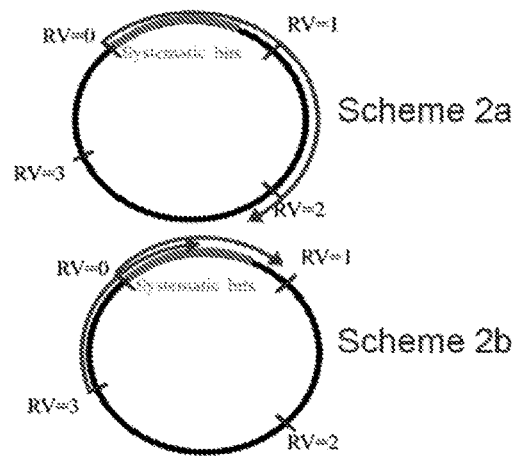
920
930
FIG. 9

1700

1702

TRANSMIT, TO A USER EQUIPMENT (UE), CHANNEL STATE INFORMATION (CSI) REFERENCE SIGNALS (RS) ACCORDING A TRANSMISSION SCHEME USING AT LEAST FIRST AND SECOND CSI REFERENCE SIGNAL (CSI-RS) RESOURCES OR PORT GROUPS

1704

RECEIVE, FROM THE UE, A PRECODING MATRIX INDICATOR (PMI) REPORT INDICATING A FIRST SET OF ONE OR MORE PMIS ASSOCIATED TO THE FIRST RESOURCE OR PORT-GROUP, A SECOND SET OF ONE OR MORE PMIS ASSOCIATED TO THE SECOND RESOURCE OR PORT-GROUP, A FIRST LAYER INDICATOR (LI) ASSOCIATED WITH THE FIRST SET OF PMIS, AND A SECOND LI ASSOCIATED WITH THE SECOND SET OF PMIS

1902
TRANSMIT, TO A USER EQUIPMENT (UE), A CHANNEL STATE INFORMATION (CSI) REPORT CONFIGURATION INDICATING AT LEAST ONE CSI REFERENCE SIGNAL (CSI-RS) RESOURCE COMPRISING AT LEAST FIRST AND SECOND CSI-RS PORT GROUPS

1904
DETERMINE A CSI CODEBOOK ASSOCIATED WITH EACH CSI-RS PORT FOR PRECODING MATRIX INDICATOR (PMI) AND CHANNEL QUALITY INDICATOR (CQI) MEASUREMENT

1906
RECEIVE, FROM THE UE, REPORTING OF A FIRST PMI MAPPED TO PORT INDICES IN THE FIRST GROUP AND A SECOND PMI MAPPED TO PORT INDICES IN THE SECOND GROUP, BASED ON PMI AND CQI MEASUREMENTS TAKEN BY THE UE USING THE DETERMINED CSI CODEBOOKS, USING A CSI-RS PORT INDEX IN A RESPECTIVE CSI-RS PORT GROUP

FIG. 19

- For 4 antenna ports {3000+p_{i,offset}, 3001+p_{i,offset}, ..., 3003+p_{i,offset}}, 8 antenna ports {3000 +p_{i,offset}, 3001 +p_{i,offset}, ..., 3007 +p_{i,offset}}, 12 antenna ports {3000 +p_{i,offset}, 3001 +p_{i,offset}, ..., 3011 +p_{i,offset}}, 16 antenna ports {3000 +p_{i,offset}, 3001 +p_{i,offset}, ..., 3015 +p_{i,offset}}, 24 antenna ports {3000 +p_{i,offset}, 3001 +p_{i,offset}, ..., 3023 +i}, and 32 antenna ports {3000 +i, 3001 +i, ..., 3031 +p_{i,offset}}, and UE configured with higher layer parameter *codebookType* set to 'typeI-SinglePannel/typeII/typeII-PortSelection/typeII-r16/typeII-PortSelection-r16', where 3000+p_{i,offset} is the port index of the first port within port-group i in the CSI-RS resource, PMI is indicates described therein the spec. If port-group is not configured, p_{i,offset} is set to zero.

FIG. 20A

- For 8 antenna ports {3000 +p_{i,offset}, 3001 +p_{i,offset}, ..., 3007 +p_{i,offset}}, 16 antenna ports {3000 +p_{i,offset}, 3001 +p_{i,offset}, ..., 3015 +p_{i,offset}}, and 32 antenna ports {3000 +p_{i,offset}, 3001 +p_{i,offset}, ..., 3031 +p_{i,offset}}, and UE configured with higher layer parameter *codebookType* set to 'typeI-MultiPanel', where 3000+p_{i,offset} is the port index of the first port within port-group i in the CSI-RS resource, PMI is indicates described therein the spec. If port-group is not configured, p_{i,offset} is set to zero.

FIG. 20B

- For 2 antenna ports {3000 +p_{i,offset}, 3001 +p_{i,offset}} and the UE configured with higher layer parameter *codebookType* set to 'typeI-SinglePanel' each PMI value corresponds to a codebook index given in Table 5.2.2.2.1-1, where 3000+p_{i,offset} is the port index of the first port within port-group i in the CSI-RS resource. If port-group is not configured, i is set to zero.

FIG. 20C

METHODS FOR PMI, RI AND PORT INDEXING OF CSI FOR MULTIPLE TRANSMITTER RECEIVER POINTS

CROSS-REFERENCE TO RELATED APPLICATIONS

This application is a national stage application under 35 U.S.C. 371 of PCT/CN2020/126103 filed Nov. 3, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to techniques for determining channel state information for multiple transmitter receiver points that utilize different frequency domain resources.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving, from a network entity, a channel state information (CSI) report configuration indicating at least first and second CSI reference signal (CSI-RS) resources or port groups associated with a CSI report, performing CSI measurement based on a frequency division multiplexing (FDM) scheme which comprises transmission via a first resource or port-group on a first set of FD units and transmission via a second resource or port-group on a second set of FD unit, and transmitting, to the network entity, a precoding matrix indicator (PMI) report indicating a first set of one or more PMIs associated to the ports in the first resource or port-group on a first set of FD units and a second set of one or more PMIs associated to the ports in the second resource or port-group on a second set of FD units.

Certain aspects provide a method for wireless communication by a network entity. The method generally includes transmitting, to a user equipment (UE), a channel state information (CSI) report configuration indicating at least first and second CSI reference signal (CSI-RS) resources or port groups associated with a CSI report, transmitting CSI-RS based on a frequency division multiplexing (FDM) scheme which comprises transmission via a first resource or port-group on a first set of FD units and transmission via a second resource or port-group on a second set of FD unit, and receiving, from the UE, a precoding matrix indicator (PMI) report indicating a first set of one or more PMIs associated to the ports in the first resource or port-group on a first set of FD units and a second set of one or more PMIs associated to the ports in the second resource or port-group on a second set of FD units.

Certain aspects provide a method for wireless communication by a user equipment (UE). The method generally includes determining a transmission scheme for channel state information (CSI) reporting using at least first and second CSI reference signal (CSI-RS) resources or port groups, performing CSI measurements based on CSI-RS transmissions sent via at least first and second CSI-RS resources or port groups, and transmitting, to the network entity, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs.

Certain aspects provide a method for wireless communication by a network entity. The method generally includes transmitting, to a user equipment (UE), channel state information (CSI) reference signals (RS) according a transmission scheme using at least first and second CSI reference signal (CSI-RS) resources or port groups and receiving, from the UE, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs.

Certain aspects provide a method for wireless communication by a user equipment (UE). The method generally includes receiving, from a network entity, a channel state information (CSI) report configuration, the configuration indicating at least one CSI reference signal (CSI-RS) resource comprising at least first and second CSI-RS port groups, determining a CSI codebook associated with each CSI-RS port for precoding matrix indicator (PMI) and channel quality indicator (CQI) measurement, and performing PMI and CQI measurement, using the determined CSI codebooks, using a CSI-RS port index in a respective CSI-RS port group, and reporting a first PMI mapped to port indices in the first group and a second PMI mapped to port indices in the second group.

Certain aspects provide a method for wireless communication by a network entity. The method generally includes transmitting, to a user equipment (UE), a channel state information (CSI) report configuration indicating at least one CSI reference signal (CSI-RS) resource comprising at least first and second CSI-RS port groups, determining a CSI codebook associated with each CSI-RS port for precoding matrix indicator (PMI) and channel quality indicator (CQI) measurement, and receiving, from the UE, reporting of a first PMI mapped to port indices in the first group and a second PMI mapped to port indices in the second group, based on PMI and CQI measurements taken by the UE using the determined CSI codebooks, using a CSI-RS port index in a respective CSI-RS port group.

Certain aspects provide means for, apparatus, and/or computer readable medium having computer executable code stored thereon for, performing techniques described herein for processing multi-TRP transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 illustrates example resource mappings for mTRP scenarios, in accordance with certain aspects of the present disclosure.

FIG. 9 illustrates examples of transport block (TB) determination, redundancy version (RV), and resource element (RE) mapping, in accordance with certain aspects of the present disclosure.

FIG. 17 illustrates example operations for wireless communications by a network entity, in accordance with certain aspects of the present disclosure.

FIG. 19 illustrates example operations for wireless communications by a network entity, in accordance with certain aspects of the present disclosure.

FIGS. 20A-C illustrate examples of PMI and CQI measurement using CSI-RS port indexing, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
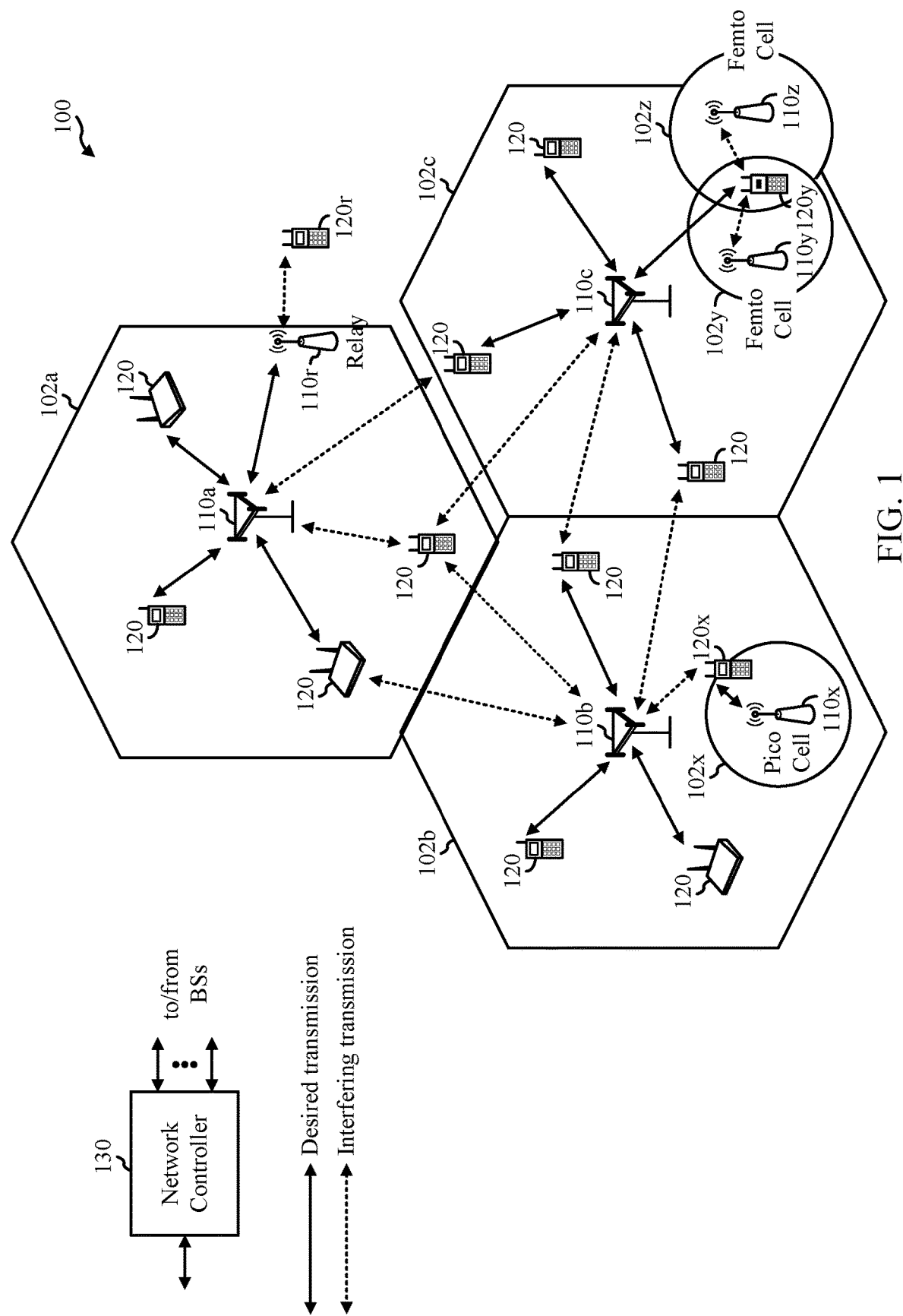
FIG. 1 is a block diagram conceptually illustrating an example telecommunications system, in accordance with certain aspects of the present disclosure.

Aspects of the present disclosure relate to wireless communications, and more particularly, to techniques for reporting channel state information (CSI), such as a precoding matrix indicator (PMI) and layer indicator (LI) in multiple transmitter receiver point (mTRP) scenarios.

In some cases, a UE may perform mTRP CSI measurement based on a frequency division multiplexing (FDM) scheme which comprises transmission via a first resource or port-group on a first set of FD units and transmission via a second resource or port-group on a second set of FD unit. The UE may transmit a PMI report indicating a first set of one or more PMIs associated to the ports in the first resource or port-group on a first set of FD units and a second set of one or more PMIs associated to the ports in the second resource or port-group on a second set of FD units.

In some cases, a UE may perform mTRP CSI measurements based on CSI-RS transmissions sent via at least first and second CSI-RS resources or port groups. The UE may transmit a PMI report indicating a first set of one or more PMIs associated to the first resource or port-group, a second set of one or more PMIs associated to the second resource or port-group, a first layer indicator (LI) associated with the first set of PMIs, and a second LI associated with the second set of PMIs.

In some cases, a UE may determine a CSI codebook associated with each CSI-RS port for PMI and channel quality indicator (CQI) measurement. The UE may perform PMI and CQI measurement, using the determined CSI codebooks, using a CSI-RS port index in a respective CSI-RS port group, and report a first PMI mapped to port indices in the first group and a second PMI mapped to port indices in the second group.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the network 100 may include one or more UEs 120 configured to perform operations 1300 of FIG. 13, operations 1600 of FIG. 16, and/or operations 1800 of FIG. 18 to measure and report mTRP CSI. Similarly, the network 100 may include one or more base stations (BSs) 110 configured to perform operations 1400 of FIG. 14, operations 1700 of FIG. 17, and/or operations 1900 of FIG. 19 to receive and process mTRP CSI reported by the UEs 120 (performing operations 1300 of FIG. 13, operations 1600 of FIG. 16, and/or operations 1800 of FIG. 18).

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
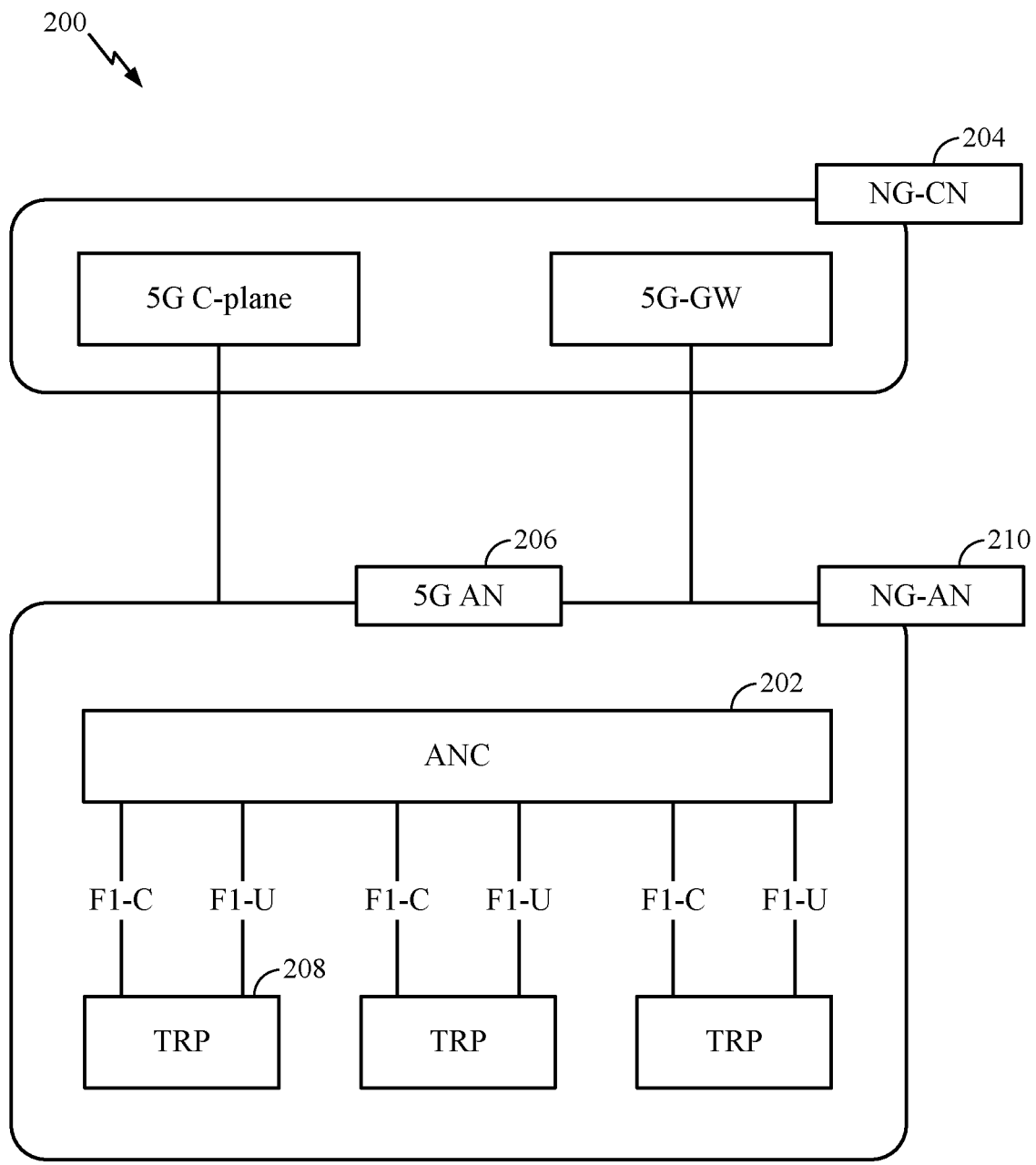
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
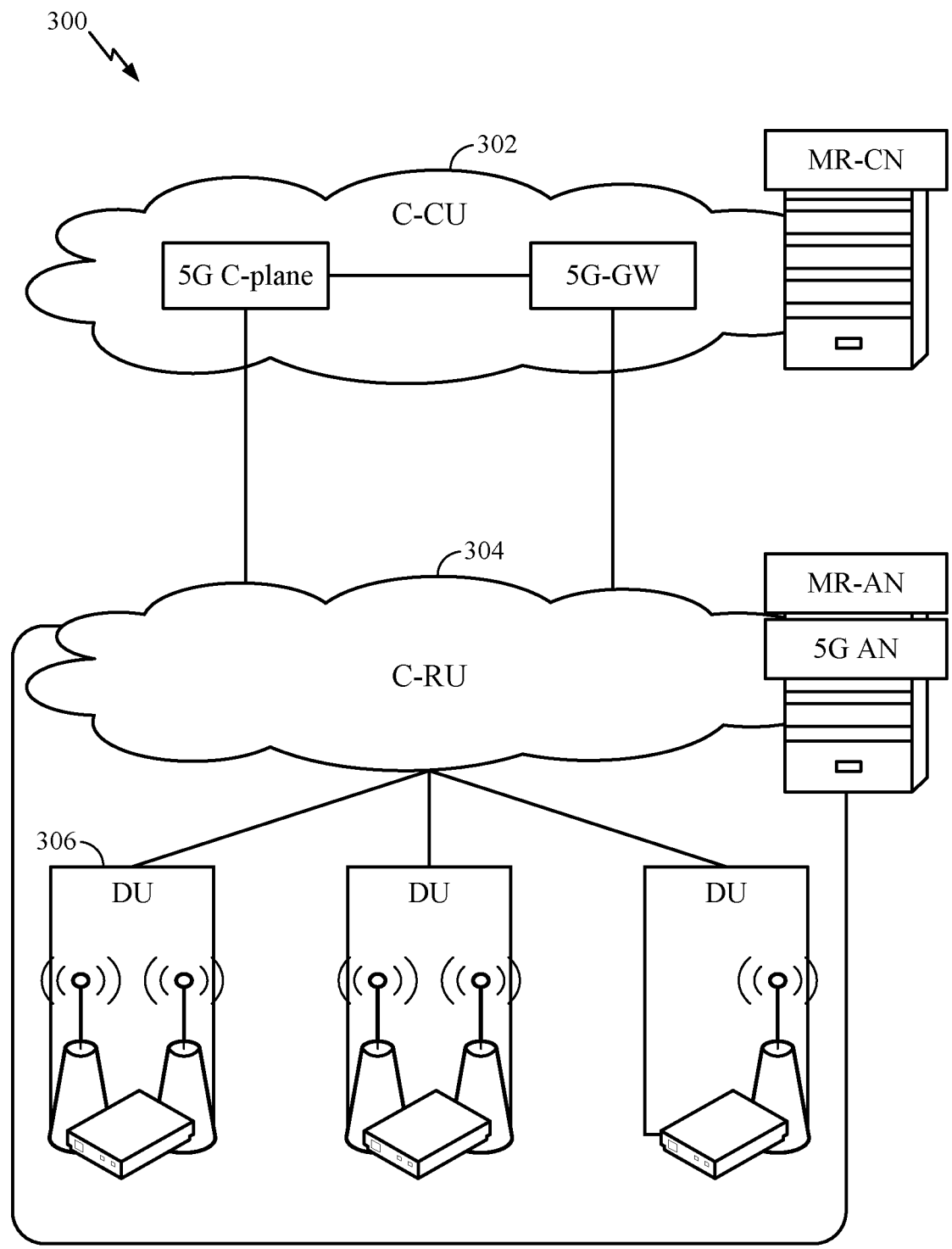
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
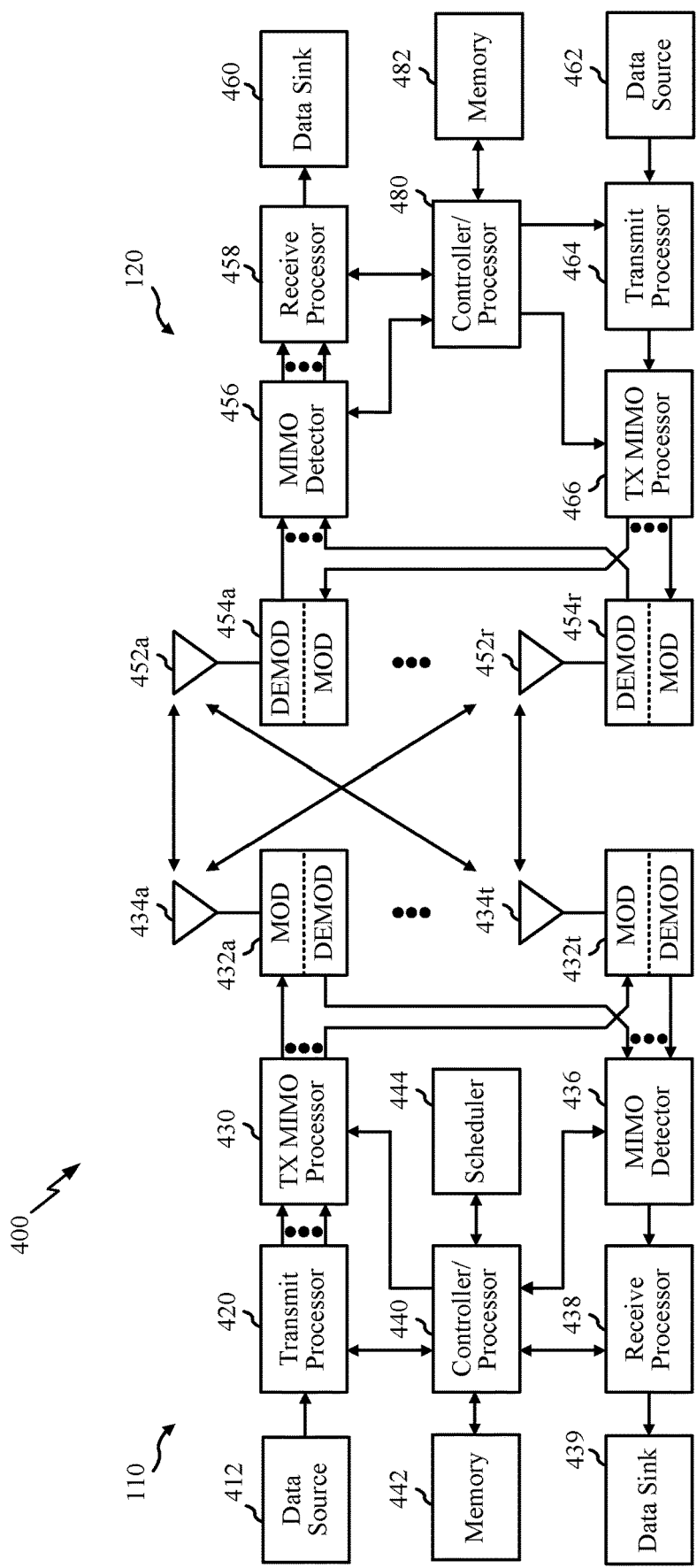
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 1300 of FIG. 13, operations 1600 of FIG. 16, and/or operations 1800 of FIG. 18. Similarly, antennas 434, processors 420, 430, 438, and/or controller/processor 440 of the BS 110 may perform (or be used to perform) operations 1400 of FIG. 14, operations 1700 of FIG. 17, and/or operations 1900 of FIG. 19.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
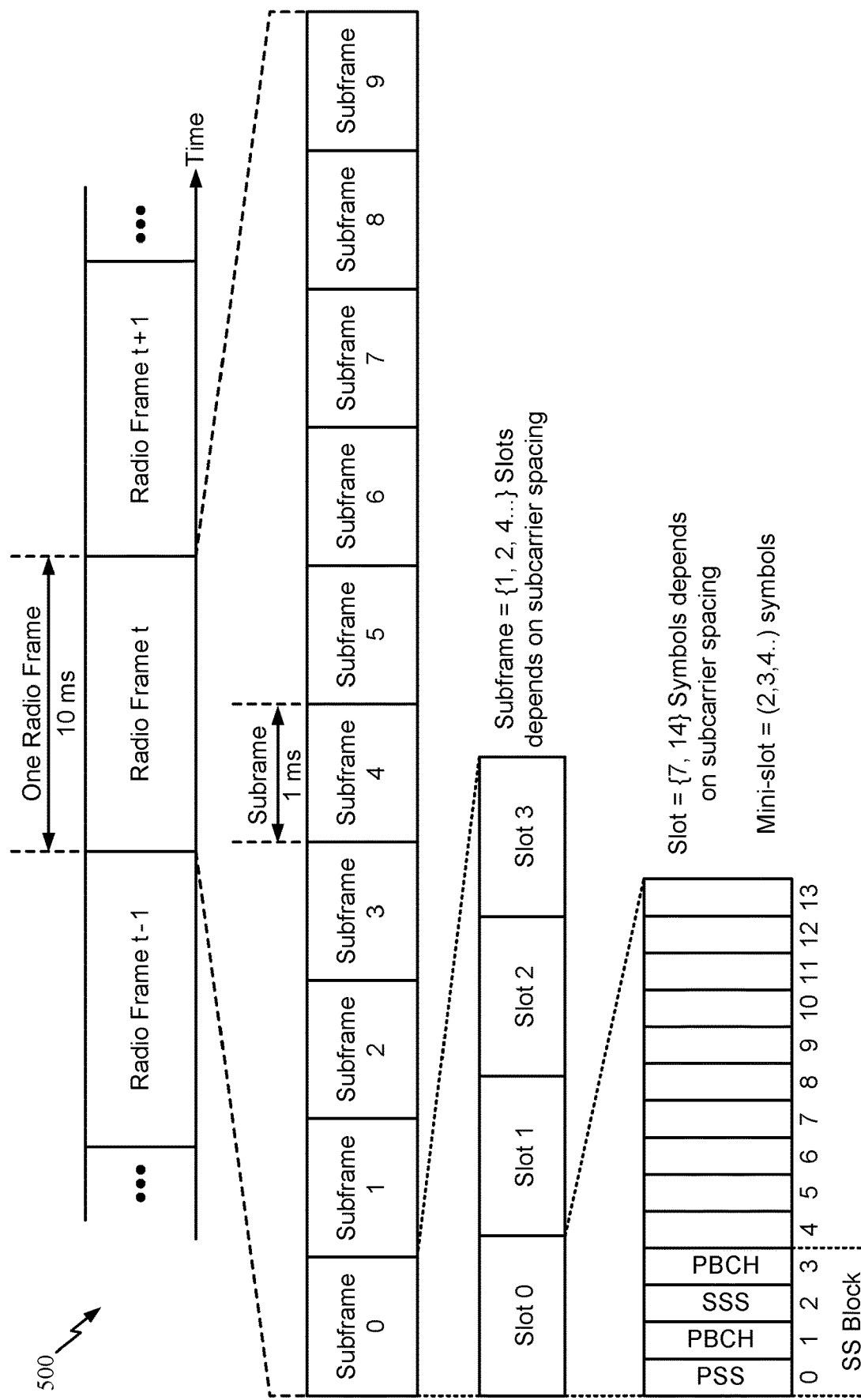
FIG. 5 illustrates example frame and subframe formats, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multi-TRP Scenarios

Figure 6:
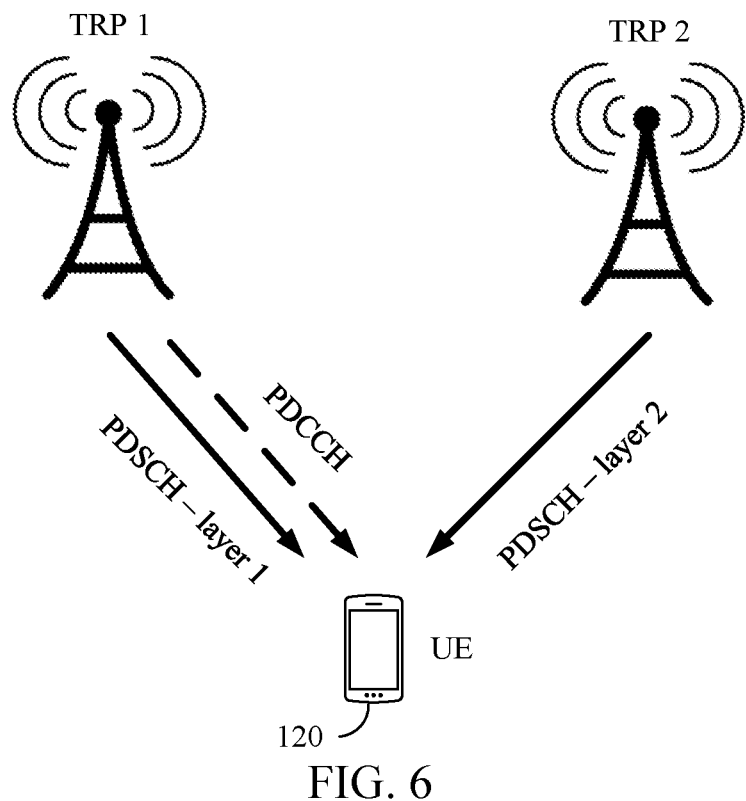
FIGS. 6 and 7 illustrate examples of single-DCI and multi-DCI multi-TRP scenarios, in accordance with certain aspects of the present disclosure.
Figure 7:
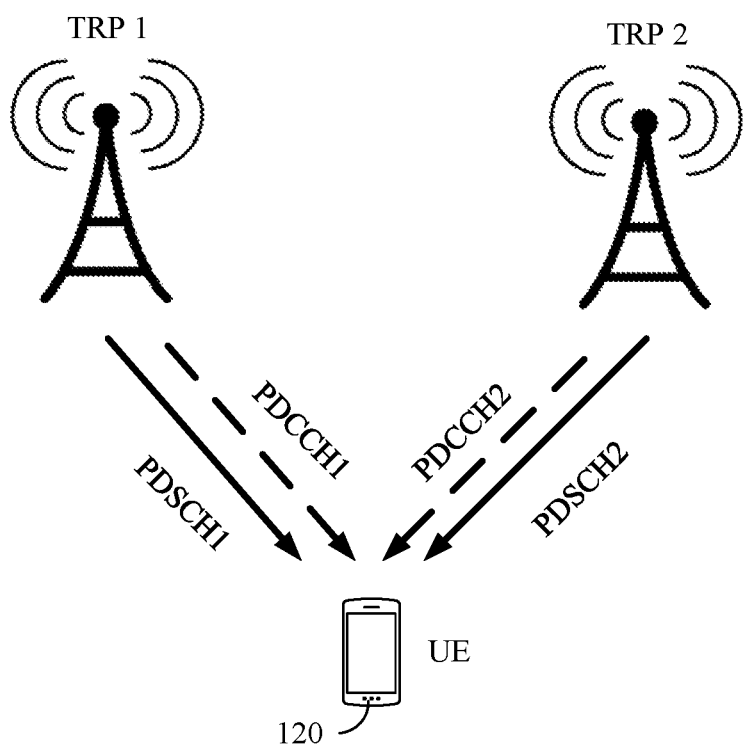

In 3GPP new radio (NR) Release 16 (R16), a multi-TRP operation was introduced to increase system capacity as well as reliability. FIGS. 6 and 7 illustrate examples scenarios of multi-TRP operation, in which aspects of the present disclosure may be practiced.

As shown in FIG. 6, in some examples, the multi-TRP transmissions may be configured based on a single downlink control information (DCI). The single DCI (e.g., transmitted via a PDCCH from a first TRP (TRP 1) schedules a physical downlink shared channel (PDSCH) from TRP 1 and a PDSCH from a second TRP (TRP 2).

Multi-TRP operation configured based on a single DCI communication may best suited for deployments with an ideal backhaul or backhaul with a small delay and may involve various transmission schemes. The transmissions schemes may include, for example, a spatial division multiplexing (SDM) scheme, frequency division multiplexing (FDM), or time division multiplexing (TDM).

With SDM, also known as non-coherent joint transmission (NCJT), a first set of layers are transmitted from TRP 1 and a second set of layers are transmitted from TRP 2. The transmissions may utilize the same frequency domain resource allocation (FDRA) and time division resource allocation (TDRA). With FDM, the transmissions from the two TRPs may have the same rank and same code word (CW), but with different FDRAs across the two TRPs. With TDM, the transmissions from the two TRPs may have the same rank and same CW, but with different TDRAs across the two TRPs.

In some cases, PDSCH may be sent in multiple parts. For example, TRP 1 may send a first part (on a first set of layers, with a first set of FDRA, and a first set of TDRA) and TRP 2 may send a second part (on a second set of layers, with a second set of FDRA, and a second set of TDRA).

As shown in FIG. 7, in some examples, the multi-TRP transmissions may be configured based on multiple DCIs. In the multi-DCI case, Each DCI schedules an individual PDSCH (similar to CA framework). For example, a first DCI from TRP 1 (e.g., transmitted in PDCCH 1) schedules PDSCH 1 from TRP 1, while a second DCI (e.g., transmitted in PDCCH 2) schedules PDSCH 2 from TRP 2. The two scheduled PDSCH may be overlapped, non-overlapped, or partially overlapped in frequency domain or time domain.

FIG. 8 illustrates example resource mapping for mTRP deployments using FDM schemes. As illustrated, two TRPs may occupy different set of RBs (from a common FDRA) with respective TCI states (TCI 1 of TRP 1 and TCI 2 of TRP 2). The FDRA field in the DCI may indicate the RB allocation for both TCI states. As illustrated, for wideband physical resource block group (PRG), RBs assigned to TCI state 1 on the first half and RBs assigned to TCI state 2 on the second half. For a narrowband PRG (equal to 2 RBs or 4RBs), even PRGs may be assigned to TCI state 1 and odd PRGs may be assigned to TCI state 2.

FIG. 9 illustrates examples of different schemes for CW-to-layer mapping, in accordance with certain aspects of the present disclosure. According to a first scheme (scheme 2A), there may be one CW and one RV, mapped to resources following the order of layers, frequency domain, and time domain. According to a second scheme (scheme 2b), a same TB may be sent with different RVs. For example, in RB set 1 (TRP1) the TB may be transmitted with a first RV, while in RB set 2 (TRP2) transmits with a second RV.

Figure 10:
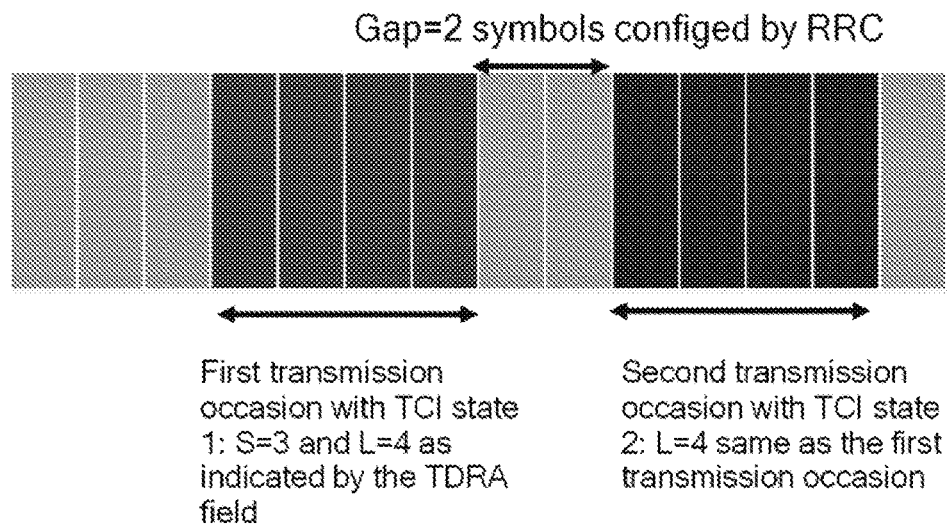
FIGS. 10 and 11 illustrate examples of repetition within one slot and across slots, respectively, in accordance with certain aspects of the present disclosure.
Figure 11:

FIGS. 10 and 11 illustrate examples of TDM schemes for repetition according to different transmission schemes. According to a first scheme (scheme 3 shown in FIG. 10), with repetition within one slot, if two TCIs are indicated, two TRPs may perform TDM transmission with repetition with a different RV. In some cases, a gap may be located between a first transmission occasion with TCI state 1 and a second transmission occasion with TCI state 2. In some cases, this gap may be configured (e.g., via the network). The length of first transmission occasion and second transmission occasion are same. In FIG. 10, the first transmission is configured with starting symbol index S=3 and length L=4, as indicated by the TDRA field. The second transmission occasion may have a TCI state 2 with length L=4, same as the first transmission occasion. In this case, the gap is 2 symbols.

According to another scheme (single-frequency-network, SFN), the PDSCH transmitted from each TRP share the same FDRA and TDRA, and same layers of same codeword are transmitted. In this case each layer may be transmitted from two TRPs, and each DMRs port may be associated with two different TCI states corresponding to TRP1 and TRP2.

According to another scheme (scheme 4 shown in FIG. 11), repetition may be performed across slots. In this case, up to 16 repetitions may be allowed across 2 TCI states. In FIG. 11, an example of 8 repetitions is shown. The TCI state pattern may also be configurable: (e.g., 12121212 vs 11221122), and the RV pattern per TCI state follows current standards (e.g., Rel-15, i.e., RV 0-2-3-1). The RV offset may be configurable, as may be an RV offset.

Example Method for PMI, RI, and Port Indexing of mTRP CSI

Aspects of the present disclosure relate to wireless communications, and more particularly, to techniques for reporting channel state information (CSI), such as a precoding matrix indicator (PMI) and layer indicator (LI) in multiple transmitter receiver point (mTRP) scenarios.

Figure 12:
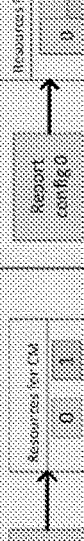
FIG. 12 illustrates example mTRP CSI categories, in accordance with certain aspects of the present disclosure.

FIG. 12 illustrates example CSI-RS report and resource configurations for different mTRP CSI categories. Depending on the category, the UE has different ways to indicate that it prefers a single TRP (to communicate with just TRP 0 or just TRP 1) or mTRP (communicate with TRP 0 and TRP 1).

As illustrated, for a first category (Cat 1.1), resources for a single report configuration (report config 0) include at least two resources, wherein each resource is configured with a single TCI state (meaning that each resource is corresponding to one TRP in other words, all ports within a resource are transmitted from one TRP. Based on CSI-RS measurement, a UE may indicate a single TRP (TRP 0 or TRP 1) by reporting a CSI-RS resource indicator (CRI) value of 0 or 1. The UE may indicate mTRP by reporting a CRI value of 2.

As illustrated, for a second category (Cat 1.2), a resource for a single report configuration (report config 0) include two CSI-RS port groups with two TCI states per resource (one TCI state per port-group indicating that a port group is corresponding to one TRP, in other words, the ports in one port-group are transmitted from one TRP). Based on CSI-RS measurement, a UE may indicate a single TRP (TRP 0 or TRP 1) by reporting a 0 rank indicator (RI) value for one of the CSI-RS port groups:

(RI0>0, 0) indicates TRP 0; or
(0, RI1>0) to indicate TRP 1.

The UE may indicate mTRP by reporting non-zero RI values for both:

(RI0>0, RI1>0) indicates mTRP.

Cat1.2 can be also mixed with Cat 1.1. That is, some resource may comprise a single TCI state, while some others comprise two port-groups each with a TCI state. Based on CSI measurement, a UE can report CRI corresponding to a resource with a single TCI state if the UE selects single TRP transmission; or the UE can report CRI corresponding to a resource with two TCI states if the UE selects multi-TRP transmission.

As illustrated, for a third category (Cat 2), two report configurations (report config 0 and report config 1) may each include a CSI-RS port group with a single TCI state. Based on CSI-RS measurement, a UE may indicate a single TRP (TRP 0 or TRP 1) by reporting a same 0 CRI value for both report 0 and report 1. The UE may indicate mTRP by reporting a CRI value of 1 for both report 0 and report 1.

These current report and resource configurations present various potential challenges. For example, since CSI-RS resources for each TRP occupies a resource block (RB) subset across the allocated frequency resource, one challenge is how to transmit CSI-RS and/or how to report CSI assuming an FDMed mTRP pattern.

Another potential challenge for all SDM, FDM and TDM schemes, PTRS ports are needed to associated with the strongest layer (DMRS port) per TRP, is how to determine and report the strongest layer per TRP.

Still another challenge (e.g., for Cat 1.2) in CSI reporting framework, where CSI is calculated per port-group, rather than all ports in the resource, is how to clarify port indexing in PMI/CQI calculations.

Aspects of the present disclosure present various techniques (configuration and reporting schemes) to address these potential challenges. For example, FIGS. 13 and 14 illustrate example UE and network side operations for reporting PMIs per CSI-RS resource or port group on the respective frequency units.

Figure 13:
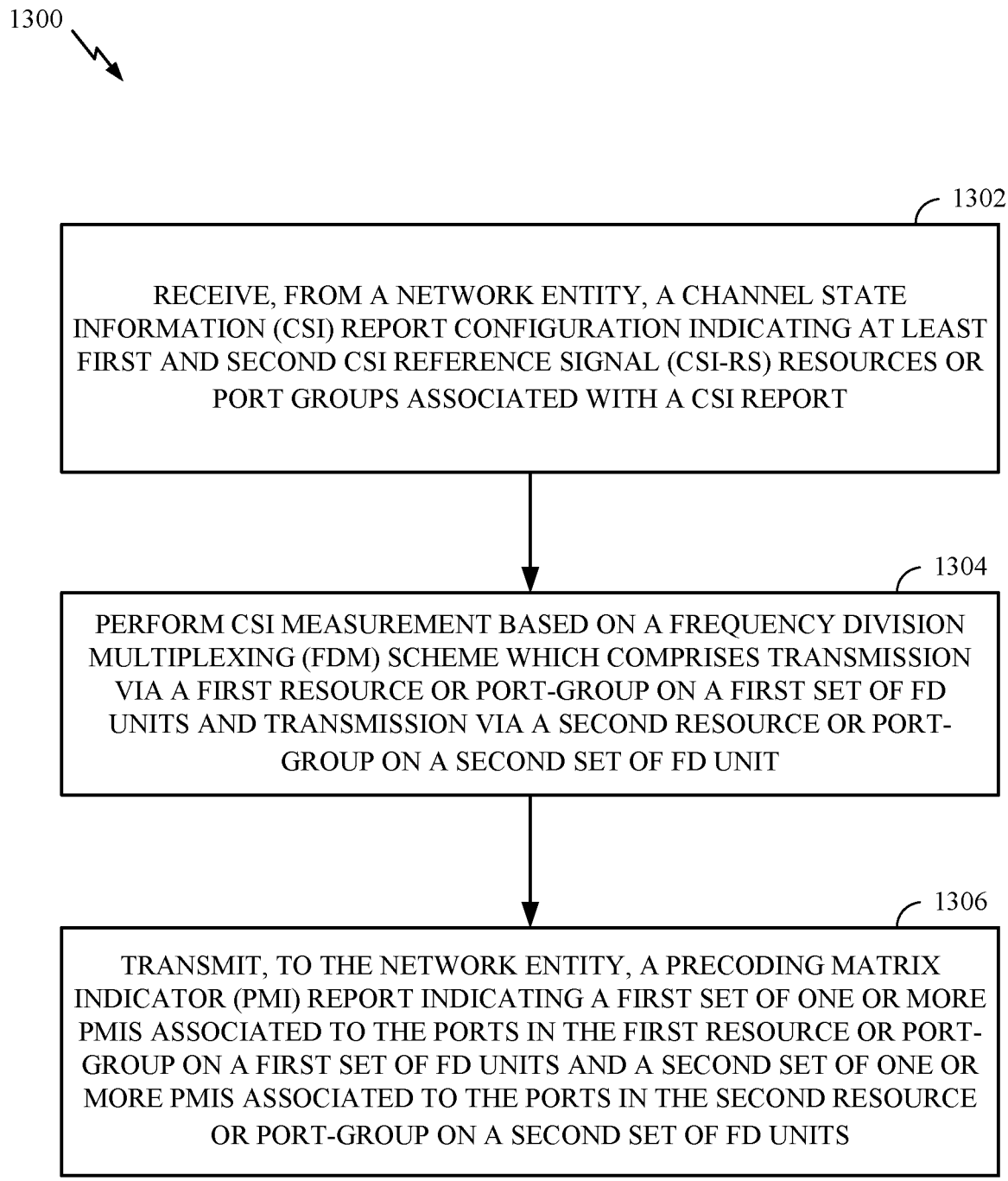
FIG. 13 illustrates example operations for wireless communications by a user equipment (UE), in accordance with certain aspects of the present disclosure.
Figure 14:
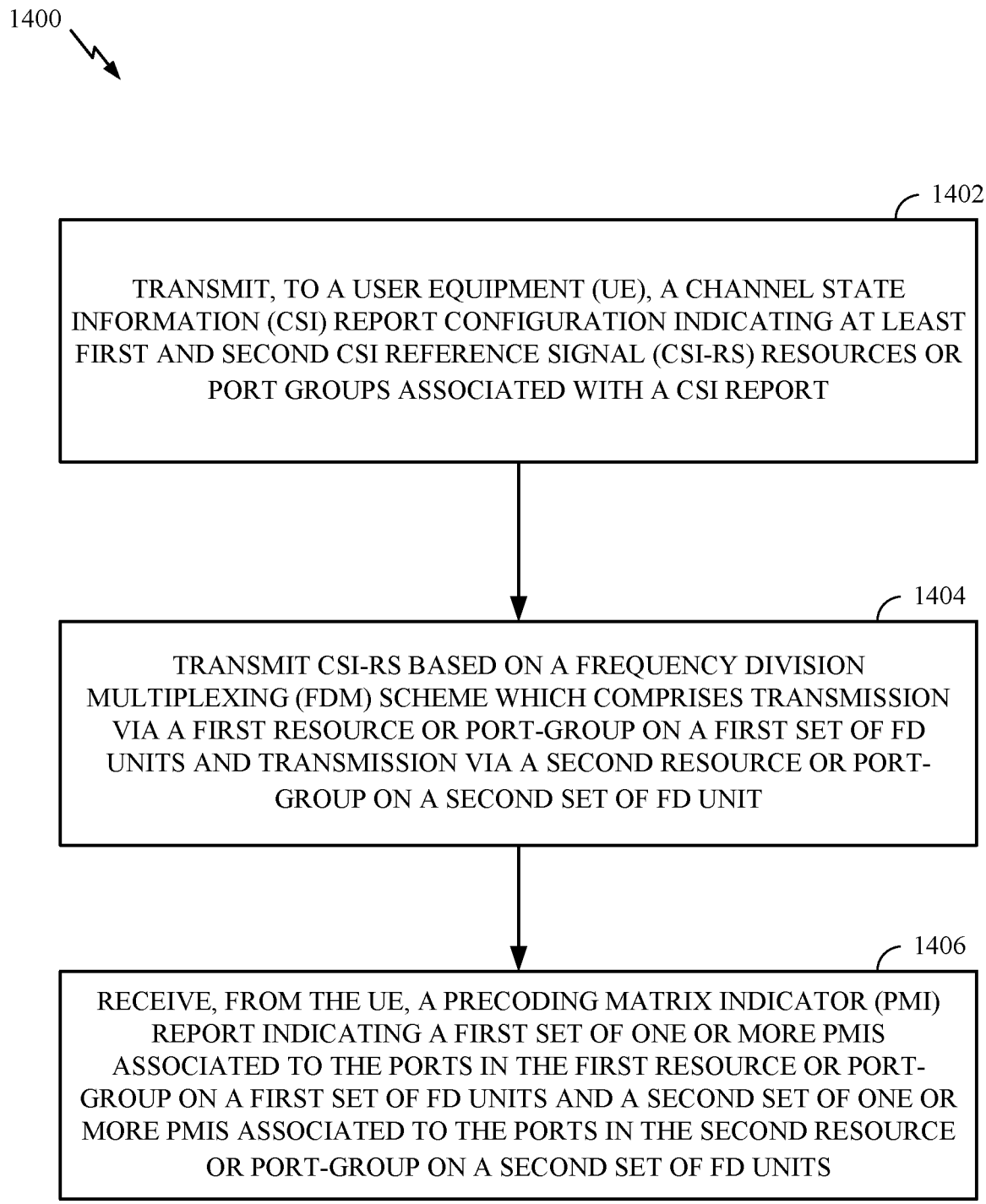
FIG. 14 illustrates example operations for wireless communications by a network entity, in accordance with certain aspects of the present disclosure.

FIG. 13 illustrates example operations 1300 for wireless communications, in accordance with certain aspects of the present disclosure. The operations 1300 may be performed, for example, by a UE (e.g., such as a UE 120 in the wireless communication network 100).

Operations 1300 begin, at 1302, by receiving, from a network entity, a channel state information (CSI) report configuration indicating at least first and second CSI reference signal (CSI-RS) resources or port groups associated with a CSI report. For example, the UE could receive at least two CSI-RS resources (per Cat 1.1) or at least two CSI-RS port groups (per Cat 1.2) associated with one or multiple CSI reports (per Cat 2). The UE may receive the CSI report configuration, for example, via the antenna(s) and receiver/transceiver components of the UE 120a shown in FIG. 4 and/or of the apparatus shown in FIG. 21, for example, using any suitable detection and decoding algorithm.

At 1304, the UE performs CSI measurement based on a frequency division multiplexing (FDM) scheme which comprises transmission via a first resource or port-group on a first set of FD units and transmission via a second resource or port-group on a second set of FD unit. The UE may perform the CSI measurement, for example, based on CSI-RS signals received via the antenna(s) and receiver/transceiver components and processors of the UE 120a shown in FIG. 4 and/or of the apparatus shown in FIG. 21, for example, using any suitable detection and algorithm for calculating CSI metrics.

At 1306, the UE transmits, to the network entity, a precoding matrix indicator (PMI) report indicating a first set of one or more PMIs associated to the ports in the first resource or port-group on a first set of FD units and a second set of one or more PMIs associated to the ports in the second resource or port-group on a second set of FD units. The UE may transmit the PMI report, for example, via the antenna(s) and receiver/transceiver components of the UE 120a shown in FIG. 4 and/or of the apparatus shown in FIG. 21, for example, using any suitable encoding and transmission algorithm.

FIG. 14 illustrate example operations 1400 for wireless communications that may be considered complementary to operations 1300 of FIG. 13. For example, operations 1400 may be performed by a network entity (e.g., such as a BS 110 in the wireless communication network 100 or a CU/DU in control of multiple TRPs) to configure and process PMI reporting from a UE performing operations 1300 of FIG. 13.

Operations 1400 begin, at 1402, by transmitting, to a user equipment (UE), a channel state information (CSI) report configuration indicating at least first and second CSI reference signal (CSI-RS) resources or port groups associated with a CSI report. At 1404, the network entity transmits CSI-RS based on a frequency division multiplexing (FDM) scheme which comprises transmission via a first resource or port-group on a first set of FD units and transmission via a second resource or port-group on a second set of FD unit. For example, the network entity may transmit the CSI report configuration (e.g., via RRC signaling) and CSI-RS via the antenna(s) and receiver/transceiver components of the BS 110a shown in FIG. 4 and/or of the apparatus shown in FIG. 21 using any suitable encoding and transmission algorithms.

At 1406, the network entity receives, from the UE, a precoding matrix indicator (PMI) report indicating a first set of one or more PMIs associated to the ports in the first resource or port-group on a first set of FD units and a second set of one or more PMIs associated to the ports in the second resource or port-group on a second set of FD units. For example, the network entity may receive the PMI report via the antenna(s) and receiver/transceiver components of the BS 110a shown in FIG. 4 and/or of the apparatus shown in FIG. 21 using any suitable detection and decoding algorithm.

Figure 15:
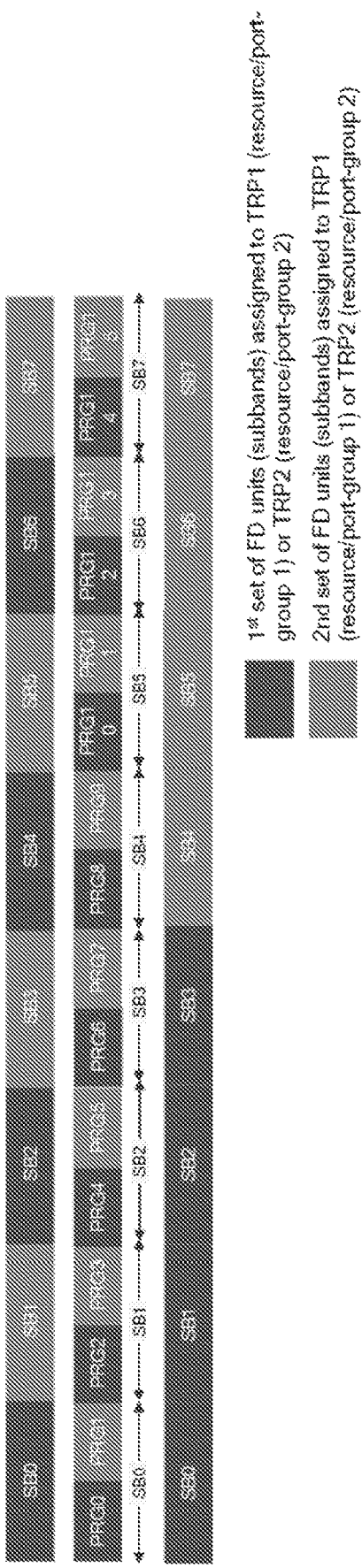
FIG. 15 illustrates an example of PMI reporting for an FDM scheme, in accordance with certain aspects of the present disclosure.

In this manner, for FDM schemes, a UE may report PMIs per CSI-RS resource or port group on the respective frequency units. FIG. 15 illustrates example of how different (first and second) sets of frequency domain (FD) units (e.g., subbands) may be assigned to different TRPs (as CSI resources or port groups). As illustrated in FIG. 15, a 1st set of FD units (subbands) assigned to TRP1 (resource/port-group 1) or TRP2 (resource/port-group 2), while a second 2nd set of FD units (subbands) assigned to TRP1 (resource/port-group 1) or TRP2 (resource/port-group 2). As shown, the first set of FD units may comprise even subbands while the second set of FD units may comprise odd subbands; alternatively, finer PMI granularity may be configured such as PRGs (smaller than a subband size), then the first FD unit set may comprise even PRGs while second set FD unit may comprise odd PRGs. Another alternative is that the first FD unit set may comprise a first half of the total FD units (first half the total subbands) while the second FD unit set may comprise a second half of the total FD units (second half of the total subbands).

In some cases, a UE may determine an FDM based transmission hypothesis using a first CSI-RS resource or port-group on a first set of FD units and using a second CSI-RS resource or port-group on a second set of FD units.

The UE may performing CSI measurement and reporting of a first set of PMIs associated with the first CSI-RS resource or port-group on the first set of FD units and using a second set of PMIs associated with the second CSI-RS resource or port-group on a second set of FD units.

There are various options for how a UE may determine a transmission (e.g., FDM scheme). According to one option, the UE may receive a configuration of an FDM scheme in the CSI report(s) configuration. According to another option, the UE may determine a transmission scheme from a set of candidate scheme hypotheses. Each candidate scheme may comprise, for example, an SDM scheme, FDM scheme, or TDM scheme. In such cases, the UE may report UE report the selected (FDM) scheme.

There are various options for how to determine the partition of frequency domain resource allocation FDRA (e.g., first/second set of FD units shown in FIG. 15). For example, the UE may determine if the FDRA indicates FD units are continuous in the first and second halves of the FDRA (left diagram of FIG. 8) or interleaved (right diagram of FIG. 8). In some cases, this information may be configured by the network (e.g., via a 1-bit indicator in the CSI report configuration or via a PRG/subband-group indicator to indicate WB, PRG=2 or 4). More specifically, with 1-bit indication, codepoint 0 (or 1) may indicate that the partition of FDRA is first second half and second half while codepoint 1 (or 0) may indicate that the partition of FDRA is interleaved. More specifically, if configured with a WB granularity, the partition of FDRA may be first second half and second half; if configured with a PRG=2 or 4, then the partition of FDRA may be interleaved on the basis of a PRG-comb (even PRGs and odd PRGs); if configured with a subband-grouping information (e.g., 2 subbands in a group), then the partition of FDRA may be interleaved on the basis of subband-group-comb (even subband-groups and odd subband-groups).

In some cases, a UE may determine the FDRA based on the actual CSI-RS transmission. For example, the UE may be able to detect that the first CSI-RS resource or port group is transmitted only on the first half and the second CSI-RS resource or port group is transmitted only on the second half. Similarly, the UE may detect that the first CSI-RS resource or port group is transmitted only on even (or odd) subbands/RBs/PRGs/subband-groups and that the second CSI-RS resource or port group is transmitted only on odd (or even) subbands/RBs/PRGs/subband-groups, indicating interleaved. The UE may report the FDRA determination.

If the determination is the FDRA is first/second half, the first FD unit set is first or the second half of the total CSI reporting subbands or RBs. If the determination is the FDRA is interleaved, the first FD unit set is odd or even subbands/RBs/PRGs/subband-groups. The TRP order (indicated which TRP is assigned the first/second half or odd/even) may be configured by the network (e.g., via a 1-bit indicator). In some cases, the TRP order (indicated which TRP is assigned the first/second half or odd/even) may be reported by UE. In some cases, the FDRA (first/second half or interleaved) and/or the TRP order may be jointly configured (or reported) with the FDM scheme. More specifically, in general, there are 4 hypotheses of FDM scheme, e.g., {TRP1 on first half, TRP2 on second half}, {TRP1 on second half, TRP2 on first half}, {TRP1 on even FD units, TRP2 on odd FD units} and {TRP1 on odd FD units, TRP2 on even FD units}. In some cases, the network may directly configure one of these for hypotheses. In some cases, the network may configure the FDRA partition as first/second half, the UE may need to report the TRP order from {TRP1 on first half, TRP2 on second half} and {TRP1 on second half, TRP2 on first half}, or network may configure the FDRA partition as interleaved (even/odd FD units), the UE may need to report the TRP order from {TRP1 on even FD units, TRP2 on odd FD units} and {TRP1 on odd FD units, TRP2 on even FD units}. In some cases, the network may configure the TRP order as TRP1 on first FD unit set and TRP 2 on second FD unit set, the UE may need to report an FDRA partition from {TRP1 on first half, TRP2 on second half} and {TRP1 on even FD units, TRP2 on odd FD units}, or the network may configure the TRP order as TRP2 on first FD unit set and TRP1 on second FD unit set, UE may need to report FDRA partition from {TRP2 on first half, TRP1 on second half} and {TRP2 on even FD units, TRP1 on odd FD units}. In some other cases, the UE may report one from the 4 hypotheses.

The first CSI-RS resource or port-group may be transmitted on the first set of FD unit, while the second CSI-RS resource or port-group may be transmitted on the second set of FD units.

The total number of precoding matrices reported in each set of PMIs may be determined based at least in part on the number of subbands in the corresponding FD unit set. For example, if eType II CSI is applied for any of the first set or second set of PMIs, the number of precoding matrices N3 (the size of FD compression matrix) may be a function of number of subbands in the corresponding FD unit set, and a higher layer parameter (e.g., numberOfPMISubbandsPerCQISubband-r16).

Figure 16:
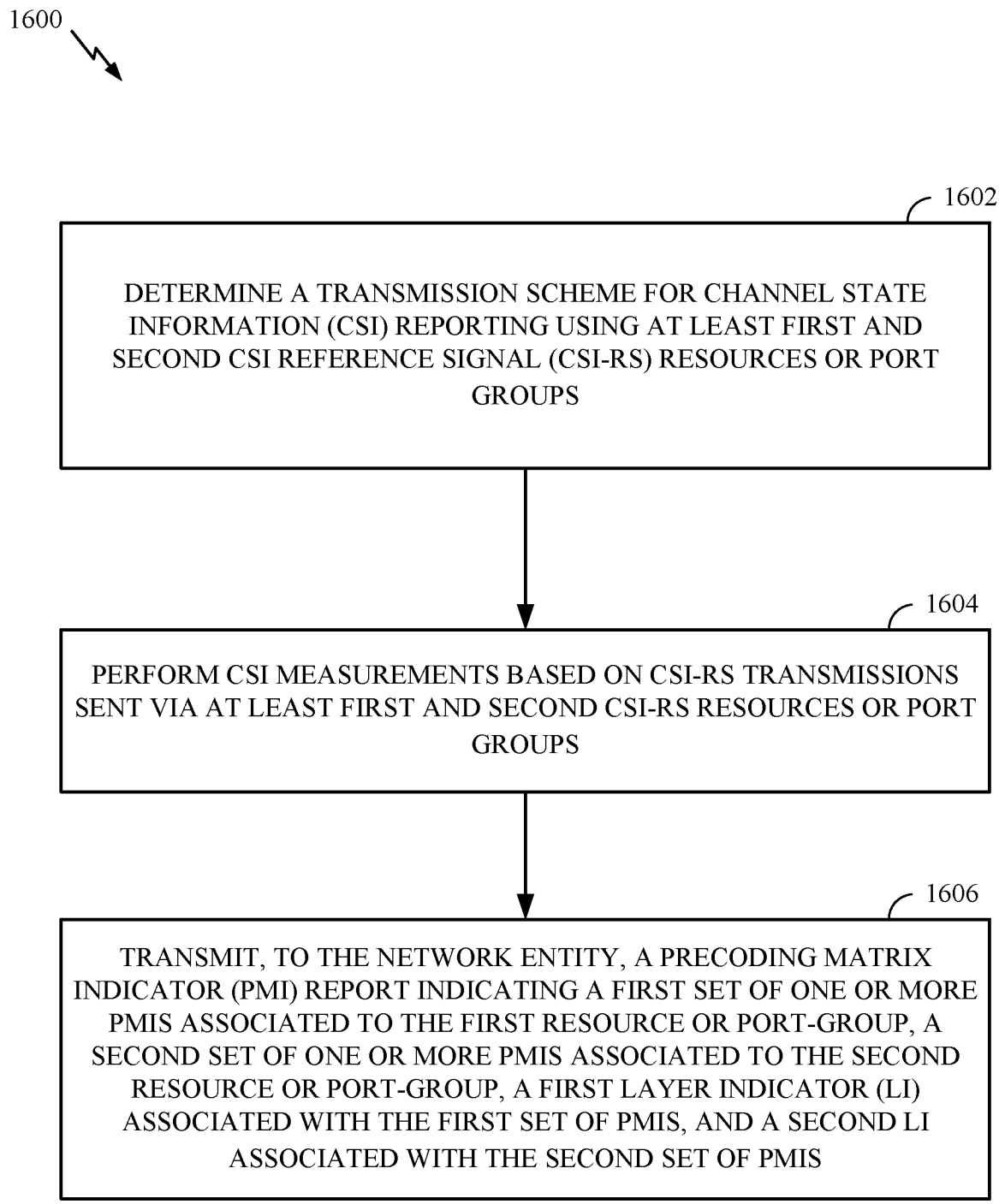
FIG. 16 illustrates example operations for wireless communications by a user equipment (UE), in accordance with certain aspects of the present disclosure.

FIGS. 16 and 17 illustrate example UE and network side operations for reporting LI pairs. For example, each LI may be associated with one of the PMIs per CSI-RS resource or port group on the respective frequency units.

FIG. 16 illustrates example operations 1600 for wireless communications, in accordance with certain aspects of the present disclosure. The operations 1600 may be performed, for example, by a UE (e.g., such as a UE 120 in the wireless communication network 100).

Operations 1600 begin, at 1602, by determining a transmission scheme for channel state information (CSI) reporting using at least first and second CSI reference signal (CSI-RS) resources or port groups. At 1604, the UE performs CSI measurements based on CSI-RS transmissions sent via at least first and second CSI-RS resources or port groups. The UE may determine the transmission scheme and perform the CSI measurement, for example, based on CSI-RS signals received via the antenna(s) and receiver/transceiver components and processors of the UE 120a shown in FIG. 4 and/or of the apparatus shown in FIG. 21, for example, using any suitable detection and algorithm.

At 1606, the UE transmits, to the network entity, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs. The UE may transmit the PMI report, for example, via the antenna(s) and receiver/transceiver components of the UE 120a shown in FIG. 4 and/or of the apparatus shown in FIG. 21, for example, using any suitable encoding and transmission algorithm.

FIG. 17 illustrate example operations 1700 for wireless communications that may be considered complementary to operations 1600 of FIG. 16. For example, operations 1700 may be performed by a network entity (e.g., such as a BS 110 in the wireless communication network 100 or a CU/DU in control of multiple TRPs) to configure and process PMI reporting from a UE performing operations 1600 of FIG. 16.

Operations 1700 begin, at 1702, by transmitting, to a user equipment (UE), channel state information (CSI) reference signals (RS) according a transmission scheme using at least first and second CSI reference signal (CSI-RS) resources or port groups. For example, the network entity may transmit the CSI-RS via the antenna(s) and receiver/transceiver components of the BS 110a shown in FIG. 4 and/or of the apparatus shown in FIG. 21 using any suitable encoding and transmission algorithms.

At 1704, the network entity receives, from the UE, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs. For example, the network entity may receive the PMI report via the antenna(s) and receiver/transceiver components of the BS 110a shown in FIG. 4 and/or of the apparatus shown in FIG. 21 using any suitable detection and decoding algorithm.

In this manner, the UE may determine a transmission scheme for CSI reporting using two CSI-RS resources or two CSI port groups and report two LIs. In other words, of the two LIs, one LI is associated with the PMI measured and reported using one of the two CSI-RS resources or port groups, while the other LI is associated with the PMI measured and reported using other of the two CSI-RS resources or port groups. In this manner, each LI indicates the strongest layer among the layers indicated by the respective PMI. The transmission scheme can be SDM, FDM, TDM or a single frequency network (SFN) scheme.

In current systems, PMI is typically calculated per resource, for example, using CSI-RS port 3000 to 3000+P−1 (wherein P is the number of ports). In current systems, CQI is typically calculated based on a virtual PDSCH layer mapping to CSI-RS port 3000 to 3000+P−1. The mapping is performed via calculated PMI (e.g., matrix W(i)). In each CSI-RS resource, the port indexing is 3000 to 3000+P−1.

One potential challenge with current systems (e.g., with Cat 1.2), is that one PMI is calculated using a first port group, and another PMI is calculated using second port-group, which means that the associated port index of PMI and CQI should be changed.

Figure 18:
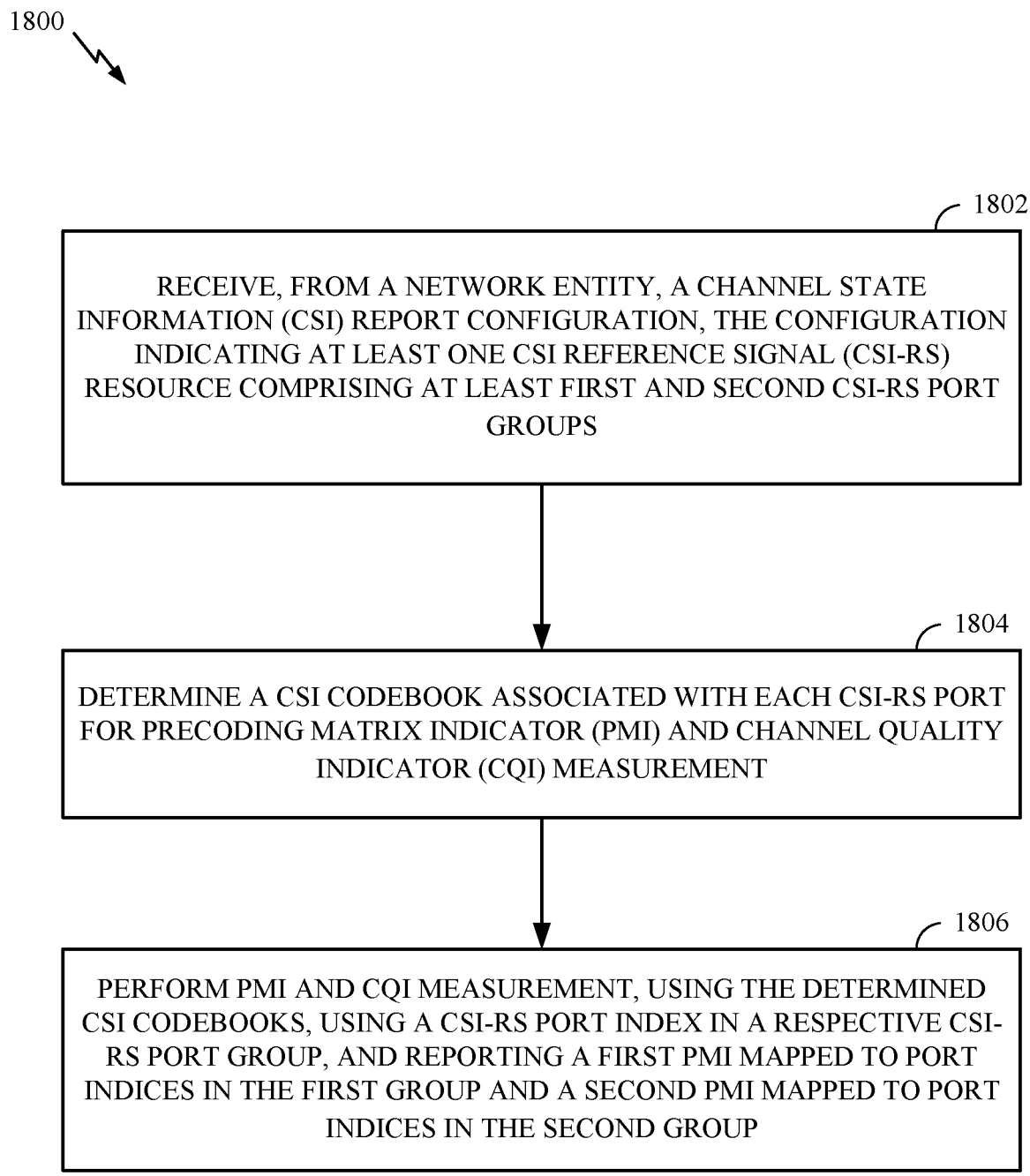
FIG. 18 illustrates example operations for wireless communications by a user equipment (UE), in accordance with certain aspects of the present disclosure.

FIGS. 18 and 19 illustrate example UE and network side operations for CSI reporting with CSI-RS port indexing. For example, a UE may perform PMI and CQI measurement using CSI-RS port index in the respective port group.

FIG. 18 illustrates example operations 1800 for wireless communications, in accordance with certain aspects of the present disclosure. The operations 1800 may be performed, for example, by a UE (e.g., such as a UE 120 in the wireless communication network 100).

Operations 1800 begin, at 1802, receiving, from a network entity, a channel state information (CSI) report configuration, the configuration indicating at least one CSI reference signal (CSI-RS) resource comprising at least first and second CSI-RS port groups. For example, the UE could receive the CSI report configuration via the antenna(s) and receiver/transceiver components of the UE 120a shown in FIG. 4 and/or of the apparatus shown in FIG. 21, for example, using any suitable detection and decoding algorithm.

At 1804, the UE determines a CSI codebook associated with each CSI-RS port for precoding matrix indicator (PMI) and channel quality indicator (CQI) measurement. At 1806, the UE performs PMI and CQI measurement, using the determined CSI codebooks, using a CSI-RS port index in a respective CSI-RS port group, and reporting a first PMI mapped to port indices in the first group and a second PMI mapped to port indices in the second group. The UE may determine the CSI codebook(s) and perform the CSI measurement, for example, based on signals received via the antenna(s) and receiver/transceiver components and processors of the UE 120a shown in FIG. 4 and/or of the apparatus shown in FIG. 21, for example, using any suitable detection and algorithm.

At 1806, the UE transmits, to the network entity, a precoding matrix indicator (PMI) report indicating a first set of one or more PMIs associated to the ports in the first resource or port-group on a first set of FD units and a second set of one or more PMIs associated to the ports in the second resource or port-group on a second set of FD units. The UE may transmit the PMI report, for example, via the antenna(s) and receiver/transceiver components of the UE 120a shown in FIG. 4 and/or of the apparatus shown in FIG. 21, for example, using any suitable encoding and transmission algorithm.

FIG. 19 illustrate example operations 1900 for wireless communications that may be considered complementary to operations 1800 of FIG. 18. For example, operations 1900 may be performed by a network entity (e.g., such as a BS 110 in the wireless communication network 100 or a CU/DU in control of multiple TRPs) to configure and process CSI reporting with CSI-RS port indexing from a UE performing operations 1800 of FIG. 18.

Operations 1900 begin, at 1902, by transmitting, to a user equipment (UE), a channel state information (CSI) report configuration indicating at least one CSI reference signal (CSI-RS) resource comprising at least first and second CSI-RS port groups. For example, the network entity may transmit the CSI report configuration (e.g., via RRC signaling) and CSI-RS via the antenna(s) and receiver/transceiver components of the BS 110a shown in FIG. 4 and/or of the apparatus shown in FIG. 21 using any suitable encoding and transmission algorithms.

At 1904, the network entity determines a CSI codebook associated with each CSI-RS port for precoding matrix indicator (PMI) and channel quality indicator (CQI) measurement. For example, the network entity may determine the CSI codebook(s) based on signals received via the antenna(s) and receiver/transceiver components and processors of the BS 110a shown in FIG. 4 and/or of the apparatus shown in FIG. 21, for example, using any suitable detection and algorithm.

At 1906, the network entity receives, from the UE, reporting of a first PMI mapped to port indices in the first group and a second PMI mapped to port indices in the second group, based on PMI and CQI measurements taken by the UE using the determined CSI codebooks, using a CSI-RS port index in a respective CSI-RS port group. For example, the network entity may receive the PMI report via the antenna(s) and receiver/transceiver components of the BS 110a shown in FIG. 4 and/or of the apparatus shown in FIG. 21 using any suitable detection and decoding algorithm.

CSI-RS reporting using CSI-RS port indexing may be understood with reference to FIGS. 20A-20C, which illustrate how a UE may determine PMI using ports with indexes starting with 3000+p_{i,offset} for different numbers of antenna ports and different codebook type configurations, where 3000+p_{i,offset} is the port index of the first port within the i-th port-group in the CSI-RS resource. In some cases, p_{i,offset} is the total number of ports in port-groups with group index smaller than i. In some cases, p_{i,offset} is the offset between the first port in the i-th port-group and the first port in the resource. In some cases, if each group has p ports, then p_{i,offset}=p*(i−1) (if the first group index is 1) or p_{i,offset}=p*i (if the first group index is 0).

FIG. 20A illustrates how a UE may determine PMI using port indexing for 4-32 antenna ports when configured with higher layer parameter codebookType set to 'typeI-Single-Pannel/typeII/typeII-PortSelection/typeII-r16/typeII-Port-Selection-r16. FIG. 20B illustrates how a UE may determine PMI using port indexing for 8-32 antenna ports when configured with higher layer parameter codebookType set to 'typeI-MultiPanel'. FIG. 20C illustrates how a UE may determine PMI using port indexing for 2 antenna ports when configured with higher layer parameter codebookType set to 'typeI-SinglePanel'. In each case, if port-group is not configured, i may be set to zero (essentially returning to conventional non-port indexed CSI-RS reporting).

For SDM schemes, for CQI calculation, the UE may assume that PDSCH signals on antenna ports in the set [1000, . . . , 1000+v−1] for v layers would result in signals equivalent to corresponding symbols transmitted on antenna ports [3000, . . . , 3000+P−1], as given by:

$$\begin{bmatrix} y^{(3000)}(i) \\ \vdots \\ y^{(3000+P_1-1)}(i) \\ y^{(3000+P_1)}(i) \\ \vdots \\ y^{(3000+P-1)}(i) \end{bmatrix} = \begin{bmatrix} W_1(i) & \\ & W_2(i) \end{bmatrix} \begin{bmatrix} x^{(0)}(i) \\ \vdots \\ x^{(v_1-1)}(i) \\ x^{(v_1)}(i) \\ \vdots \\ x^{(v-1)}(i) \end{bmatrix},$$

where W1 may be calculated using first port-group with index 3000 to 3000+P1−1 and there are v1 layers comprised in W1 and W2 may be calculated using second port-group with index 3000+P1 to 3000+P−1 and there are v-v1 layers comprised in W2, where P1 is the number of ports in the first port-group while P is the number of total ports in the resource.

For TDM and FDM schemes, for CQI calculation, the UE may assume that PDSCH signals on antenna ports in the set [1000, . . . , 1000+v−1] for v layers would result in signals equivalent to corresponding symbols transmitted on antenna ports [3000, . . . , 3000+P−1], as given by $$\begin{bmatrix} y^{(3000)} \\ \vdots \\ y^{(3000+P_1-1)} \end{bmatrix} = W_1(i) \begin{bmatrix} x^{(0)}(i) \\ \vdots \\ x^{(v-1)}(i) \end{bmatrix}$$

on a first set of FD units if FDM scheme or on a first set of TD units if TDM scheme and $$\begin{bmatrix} y^{(3000+P_1)} \\ \vdots \\ y^{(3000+P-1)} \end{bmatrix} = W_2(i) \begin{bmatrix} x^{(0)}(i) \\ \vdots \\ x^{(v-1)}(i) \end{bmatrix}$$

on a second set of FD units if FDM scheme or on a second set of TD units if TDM scheme, where the layers mapped to W1 and W2 are same layers from a same TB. The mapping procedure may follow a layer mapping defined for mTRP FDM and TDM schemes (e.g., as described with reference to FIG. 9).

Figure 21:
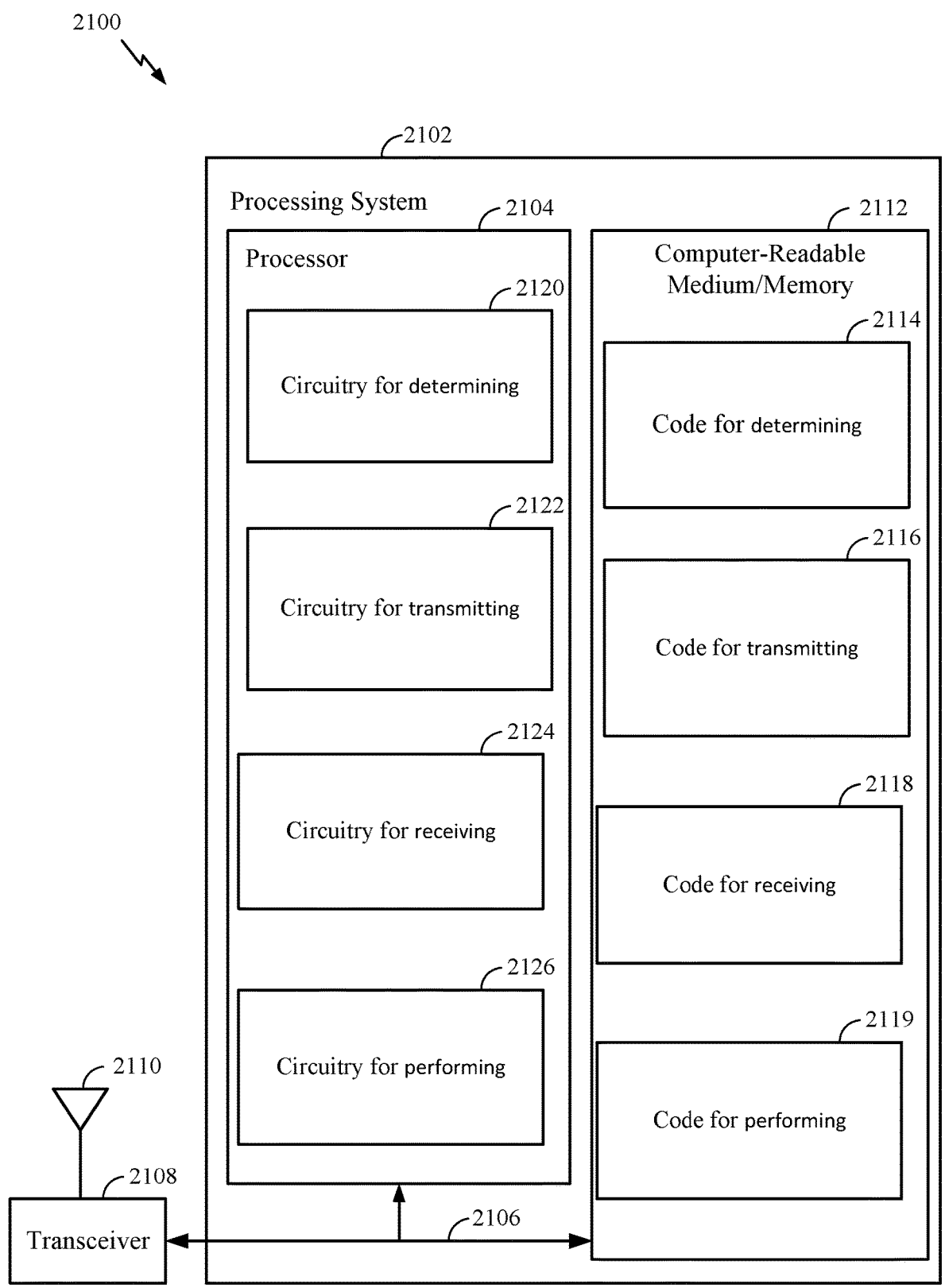
FIG. 21 illustrates an apparatus with example components capable of performing operations, in accordance with certain aspects of the present disclosure.

FIG. 21 illustrates a communications device 2100 that may include various components (e.g., corresponding to means-plus-function components) configured to perform operations for the techniques disclosed herein, such as the operations illustrated in FIGS. 13, 14, 16, 17, 18, and/or 19. The communications device 2100 includes a processing system 2102 coupled to a transceiver 2108. The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., computer-executable code) that when executed by the processor 2104, cause the processor 2104 to perform the operations illustrated in FIGS. 13, 14, 16, 17, 18, and/or 19. In certain aspects, computer-readable medium/memory 2112 stores code 2114 for determining; code 2116 for transmitting; code 1018 for receiving; and code 1019 for performing. In certain aspects, the processor 1004 has circuitry configured to implement the code stored in the computer-readable medium/memory 1012. The processor 1004 includes circuitry 1022 for determining; circuitry 1024 for transmitting; circuitry 1026 for receiving; and circuitry 1028 for performing.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Example Aspects

Aspect 1: A method for wireless communications by a user equipment (UE), comprising: receiving, from a network entity, a channel state information (CSI) report configuration indicating at least first and second CSI reference signal (CSI-RS) resources or port groups associated with a CSI report; performing CSI measurement based on a frequency division multiplexing (FDM) scheme which comprises transmission via a first resource or port-group on a first set of FD units and transmission via a second resource or port-group on a second set of FD unit; and transmitting, to the network entity, a precoding matrix indicator (PMI) report indicating a first set of one or more PMIs associated to the ports in the first resource or port-group on a first set of FD units and a second set of one or more PMIs associated to the ports in the second resource or port-group on a second set of FD units.

Aspect 2: The method of Aspect 1, wherein the FD units comprise subbands or PRGs.

Aspect 3: The method of Aspect 2, further comprising receiving a configuration indicating the FDM scheme.

Aspect 4: The method of Aspect 2, further comprising: selecting an FDM scheme, from a set of candidate schemes; and reporting the selected FDM scheme to the network entity.

Aspect 5: The method of any one of Aspects 1-3, further comprising receiving an indication of a frequency domain resource allocation (FDRA) that indicates whether the first and second sets of FD units are interleaved or span continuous sets of FD units.

Aspect 6: The method of Aspect 5, wherein the indication is provided via the CSI report configuration or via a precoding block resource group (PRG) or subband group indicator.

Aspect 7: The method of Aspect 6, wherein the configuration comprises a joint configuration of FDM scheme for CSI measurement and the FDRA of the first FD unit set for the first resource or port-group and the FDRA of the first FD unit set for the first resource or port-group second sets of FD units.

Aspect 8: The method of any one of Aspects 1-7, further comprising determining, based on actual CSI-RS transmission, whether the first and second sets of FD units are interleaved or span continuous sets of FD units.

Aspect 9: The method of any one of Aspects 1-8, further comprising: selecting a candidate frequency division resource allocation FDRA for the first and second sets of FD units, from a set of candidate FDRAs; and reporting the selected FDRA to the network entity.

Aspect 10: The method of Aspect 9, wherein the reporting jointly indicates an FDM scheme from a set of candidate schemes and its FDRA, selected by the UE.

Aspect 11: The method of any one of Aspects 1-10, wherein: a total number of precoding matrices reported in the first set of PMIs is determined based at least in part on a number of subbands in the first set of FD units; and a total number of precoding matrices reported in the second set of PMIs is determined based at least in part on a number of subbands in the second set of FD units.

Aspect 12: The method of any one of Aspects 1-11, wherein: if a certain type of CSI is applied for any of the first set of PMIs or second set of PMIs, a number of precoding matrices reported is a function of a number of subbands in the corresponding set of FD units and configured parameter.

Aspect 13: A method for wireless communications by a user equipment (UE), comprising: determining a transmission scheme for channel state information (CSI) reporting using at least first and second CSI reference signal (CSI-RS) resources or port groups; performing CSI measurements based on CSI-RS transmissions sent via at least first and second CSI-RS resources or port groups; and transmitting, to the network entity, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs.

Aspect 14: The method of Aspect 13, wherein the transmission scheme comprises spatial division multiplexing (SDM).

Aspect 15: The method of any one of Aspects 13-14, wherein the transmission scheme comprises time division multiplexing (TDM).

Aspect 16: The method of any one of Aspects 13-15, wherein the transmission scheme comprises frequency division multiplexing (FDM).

Aspect 17: The method of Aspect 16, wherein: the first CSI measurements are performed based on the first CSI-RS resource or port group received on a first set of frequency domain (FD) units; and the second CSI measurements are performed based on the second CSI-RS resource or port group received on a second set of FD units.

Aspect 18: The method of any one of Aspects 13-17, wherein: the first LI indicates a strongest layer among layers indicated by the first set of PMIs; and the second LI indicates a strongest layer among layers indicated by the second set of PMIs.

Aspect 19: A method for wireless communications by a user equipment (UE), comprising: receiving, from a network entity, a channel state information (CSI) report configuration, the configuration indicating at least one CSI reference signal (CSI-RS) resource comprising at least first and second CSI-RS port groups; determining a CSI codebook associated with each CSI-RS port for precoding matrix indicator (PMI) and channel quality indicator (CQI) measurement; and performing PMI and CQI measurement, using the determined CSI codebooks, using a CSI-RS port index in a respective CSI-RS port group, and reporting a first PMI mapped to port indices in the first group and a second PMI mapped to port indices in the second group.

Aspect 20: The method of Aspect 19, wherein the CQI measurement depends, at least in part, on a transmission scheme used for the CSI RS reporting.

Aspect 21: The method of Aspect 20, wherein, if the transmission scheme comprises spatial division multiplexing (SDM) scheme, the UE calculates CQI assuming a physical downlink shared channel (PDSCH) based on a first mapping form a first set of layers to the first port-group with a first index via the first precoding matrix indicated via a first PMI and a second mapping form a second set of layers to the second port-group with a second index via a second precoding matrix indicated via the second PMI.

Aspect 22: The method of any one of Aspects 19-21, wherein, if the transmission scheme comprises frequency division multiplexing (FDM) scheme, the UE calculates CQI assuming a physical downlink shared channel (PDSCH) based on: the first PMI mapping a first layer to the first port group on a first set of frequency domain (FD) units; and the second PMI mapping a second layer to the second port group on a second set of FD units.

Aspect 23: The method of any one of Aspects 19-22, wherein, if the transmission scheme comprises time division multiplexing (TDM) scheme, the UE calculates CQI assuming a physical downlink shared channel (PDSCH) based on: the first PMI mapping a first layer to the first port group on a first set of time domain (TD) units; and the second PMI mapping a second layer to the second port group on a second set of TD units.

Aspect 24: A method for wireless communications by a network entity, comprising: transmitting, to a user equipment (UE), a channel state information (CSI) report configuration indicating at least first and second CSI reference signal (CSI-RS) resources or port groups associated with a CSI report; and transmitting CSI-RS based on a frequency division multiplexing (FDM) scheme which comprises transmission via a first resource or port-group on a first set of FD units and transmission via a second resource or port-group on a second set of FD unit; and receiving, from the UE, a precoding matrix indicator (PMI) report indicating a first set of one or more PMIs associated to the ports in the first resource or port-group on a first set of FD units and a second set of one or more PMIs associated to the ports in the second resource or port-group on a second set of FD units.

Aspect 25: The method of Aspect 24, wherein the FD units comprise subbands or PRGs.

Aspect 26: The method of Aspect 25, further comprising transmitting, to the UE, a configuration indicating the FDM scheme.

Aspect 27: The method of any one of Aspects 24-25, further comprising: sending, to the UE, a set of candidate schemes; and receiving, from the UE, a report indicating an FDM scheme selected from the set of candidate schemes.

Aspect 28: The method of any one of Aspects 24-27, further comprising providing, to the UE, an indication of a frequency domain resource allocation (FDRA) that indicates whether the first and second sets of FD units are interleaved or span continuous sets of FD units.

Aspect 29: The method of Aspect 28, wherein the indication is provided via the CSI report configuration or via a precoding block resource group (PRG) or subband group indicator.

Aspect 30: The method of Aspect 29, wherein the configuration comprises a joint configuration of FDM scheme for CSI measurement and the FDRA of the first FD unit set for the first resource or port-group and the FDRA of the first FD unit set for the first resource or port-group second sets of FD units.

Aspect 31: The method of any one of Aspects 24-30, further comprising: sending, to the UE, a set of candidate frequency domain resource allocations (FDRAs); and receiving, from the UE, an indication of an FDRA selected from the set of candidate FDRAs.

Aspect 32: The method of Aspect 31, wherein the indication jointly indicates an FDM scheme from a set of candidate schemes and its FDRA, selected by the UE.

Aspect 33: The method of any one of Aspects 24-32, wherein: a total number of precoding matrices reported in the first set of PMIs is determined based at least in part on a number of subbands in the first set of FD units; and a total number of precoding matrices reported in the second set of PMIs is determined based at least in part on a number of subbands in the second set of FD units.

Aspect 34: The method of Aspects 24-33, wherein: if a certain type of CSI is applied for any of the first set of PMIs or second set of PMIs, a number of precoding matrices reported is a function of a number of subbands in the corresponding set of FD units and configured parameter.

Aspect 35: A method for wireless communications by a network entity, comprising: transmitting, to a user equipment (UE), channel state information (CSI) reference signals (RS) according a transmission scheme using at least first and second CSI reference signal (CSI-RS) resources or port groups; and receiving, from the UE, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs.

Aspect 36: The method of Aspect 35, wherein the transmission scheme comprises spatial division multiplexing (SDM).

Aspect 37: The method of Aspects 35-36, wherein the transmission scheme comprises time division multiplexing (TDM).

Aspect 38: The method of Aspects 35-37, wherein the transmission scheme comprises frequency division multiplexing (FDM).

Aspect 39: The method of Aspects 35-38, wherein: the first LI indicates a strongest layer among layers indicated by the first set of PMIs; and the second LI indicates a strongest layer among layers indicated by the second set of PMIs.

Aspect 40: A method for wireless communications by a network entity, comprising: transmitting, to a user equipment (UE), a channel state information (CSI) report configuration indicating at least one CSI reference signal (CSI-RS) resource comprising at least first and second CSI-RS port groups; determining a CSI codebook associated with each CSI-RS port for precoding matrix indicator (PMI) and channel quality indicator (CQI) measurement; and receiving, from the UE, reporting of a first PMI mapped to port indices in the first group and a second PMI mapped to port indices in the second group, based on PMI and CQI measurements taken by the UE using the determined CSI codebooks, using a CSI-RS port index in a respective CSI-RS port group.

Aspect 41: The method of Aspect 40, wherein the CQI measurement depends, at least in part, on a transmission scheme used for the CSI RS reporting.

Aspect 42: The method of Aspect 41, wherein, if the transmission scheme comprises spatial division multiplexing (SDM) scheme, the UE calculates CQI assuming a physical downlink shared channel (PDSCH) based on a first mapping form a first set of layers to the first port-group with a first index via the first precoding matrix indicated via a first PMI and a second mapping form a second set of layers to the second port-group with a second index via a second precoding matrix indicated via the second PMI.

Aspect 43: The method of Aspects 40-42, wherein, if the transmission scheme comprises frequency division multiplexing (FDM) scheme, the UE calculates CQI assuming a physical downlink shared channel (PDSCH) based on: the first PMI mapping a first layer to the first port group on a first set of frequency domain (FD) units; and the second PMI mapping a second layer to the second port group on a second set of FD units.

Aspect 44: The method of Aspects 40-43, wherein, if the transmission scheme comprises time division multiplexing (TDM) scheme, the UE calculates CQI assuming a physical downlink shared channel (PDSCH) based on: the first PMI mapping a first layer to the first port group on a first set of time domain (TD) units; and the second PMI mapping a second layer to the second port group on a second set of TD units.

Aspect 45: An apparatus comprising at least one processor and a memory configured to perform operations of the method of any one of Aspects 1-44.

Aspect 46: An apparatus comprising means for performing operations of the method of any one of Aspects 1-44.

Aspect 47: A computer readable medium having instructions stored thereon for performing operations of the method of any one of Aspects 1-44.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7, and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving, from a network entity, a channel state information (CSI) report configuration indicating at least first and second CSI reference signal (CSI-RS) resources or port groups associated with a CSI report;
   performing CSI measurement based on a frequency division multiplexing (FDM) scheme which comprises transmission via a first resource or port-group on a first set of FD units and transmission via a second resource or port-group on a second set of FD unit; and
   transmitting, to the network entity, a precoding matrix indicator (PMI) report indicating a first set of one or more PMIs associated to the ports in the first resource or port-group on a first set of FD units and a second set of one or more PMIs associated to the ports in the second resource or port-group on a second set of FD units.

2. The method of claim 1, wherein the FD units comprise subbands or PRGs.

3. The method of claim 2, further comprising receiving a configuration indicating the FDM scheme.

4. The method of claim 2, further comprising:
   selecting an FDM scheme, from a set of candidate schemes; and
   reporting the selected FDM scheme to the network entity.

5. The method of claim 1, further comprising receiving an indication of a frequency domain resource allocation (FDRA) that indicates whether the first and second sets of FD units are interleaved or span continuous sets of FD units.

6. The method of claim 5, wherein the indication is provided via the CSI report configuration or via a precoding block resource group (PRG) or subband group indicator.

7. The method of claim 6, wherein the configuration comprises a joint configuration of FDM scheme for CSI measurement and the FDRA of the first FD unit set for the first resource or port-group and the FDRA of the first FD unit set for the first resource or port-group second sets of FD units.

8. The method of claim 1, further comprising determining, based on actual CSI-RS transmission, whether the first and second sets of FD units are interleaved or span continuous sets of FD units.

9. The method of claim 1, further comprising:
   selecting a candidate frequency division resource allocation FDRA for the first and second sets of FD units, from a set of candidate FDRAs; and
   reporting the selected FDRA to the network entity.

10. The method of claim 9, wherein the reporting jointly indicates an FDM scheme from a set of candidate schemes and its FDRA, selected by the UE.

11. The method of claim 1, wherein:
    a total number of precoding matrices reported in the first set of PMIs is determined based at least in part on a number of subbands in the first set of FD units; and
    a total number of precoding matrices reported in the second set of PMIs is determined based at least in part on a number of subbands in the second set of FD units.

12. The method of claim 1, wherein:
    if a certain type of CSI is applied for any of the first set of PMIs or second set of PMIs, a number of precoding matrices reported is a function of a number of subbands in the corresponding set of FD units and configured parameter.

13. A method for wireless communications by a user equipment (UE), comprising:
    determining a transmission scheme for channel state information (CSI) reporting using at least first and second CSI reference signal (CSI-RS) resources or port groups;
    performing CSI measurements based on CSI-RS transmissions sent via at least first and second CSI-RS resources or port groups; and
    transmitting, to the network entity, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs.

14. The method of claim 13, wherein the transmission scheme comprises spatial division multiplexing (SDM).

15. The method of claim 13, wherein the transmission scheme comprises time division multiplexing (TDM).

16. The method of claim 13, wherein the transmission scheme comprises frequency division multiplexing (FDM).

17. The method of claim 16, wherein:
    the first CSI measurements are performed based on the first CSI-RS resource or port group received on a first set of frequency domain (FD) units; and
    the second CSI measurements are performed based on the second CSI-RS resource or port group received on a second set of FD units.

18. The method of claim 13, wherein:
the first LI indicates a strongest layer among layers indicated by the first set of PMIs; and
the second LI indicates a strongest layer among layers indicated by the second set of PMIs.

19. An apparatus for wireless communications by a user equipment (UE), comprising:
at least one processor and a memory configured to
receive, from a network entity, a channel state information (CSI) report configuration indicating at least first and second CSI reference signal (CSI-RS) resources or port groups associated with a CSI report;
perform CSI measurement based on a frequency division multiplexing (FDM) scheme which comprises transmission via a first resource or port-group on a first set of FD units and transmission via a second resource or port-group on a second set of FD unit; and
transmit, to the network entity, a precoding matrix indicator (PMI) report indicating a first set of one or more PMIs associated to the ports in the first resource or port-group on a first set of FD units and a second set of one or more PMIs associated to the ports in the second resource or port-group on a second set of FD units.

20. The apparatus of claim 19, wherein the FD units comprise subbands or PRGs and wherein the at least one processor and the memory are further configured to receive a configuration indicating the FDM scheme.

21. The apparatus of claim 19, wherein the FD units comprise subbands or PRGs and wherein the at least one processor and the memory are further configured to:
select an FDM scheme, from a set of candidate schemes; and
report the selected FDM scheme to the network entity.

22. The apparatus of claim 19, wherein the at least one processor and the memory are further configured to receive an indication of a frequency domain resource allocation (FDRA) that indicates whether the first and second sets of FD units are interleaved or span continuous sets of FD units.

23. The apparatus of claim 19, wherein the at least one processor and the memory are further configured to determine, based on actual CSI-RS transmission, whether the first and second sets of FD units are interleaved or span continuous sets of FD units.

24. The apparatus of claim 19, wherein the at least one processor and the memory are further configured to:
select a candidate frequency division resource allocation FDRA for the first and second sets of FD units, from a set of candidate FDRAs; and
report the selected FDRA to the network entity.

25. The apparatus of claim 19, wherein:
a total number of precoding matrices reported in the first set of PMIs is determined based at least in part on a number of subbands in the first set of FD units; and
a total number of precoding matrices reported in the second set of PMIs is determined based at least in part on a number of subbands in the second set of FD units.

26. The apparatus of claim 19, wherein:
if a certain type of CSI is applied for any of the first set of PMIs or second set of PMIs, a number of precoding matrices reported is a function of a number of subbands in the corresponding set of FD units and configured parameter.

27. An apparatus for wireless communications by a user equipment (UE), comprising:
at least one processor and a memory configured to
determine a transmission scheme for channel state information (CSI) reporting using at least first and second CSI reference signal (CSI-RS) resources or port groups;
perform CSI measurements based on CSI-RS transmissions sent via at least first and second CSI-RS resources or port groups; and
transmit, to the network entity, a precoding matrix indicator (PMI) report indicating a first set of one or more PMIs associated to the first resource or port-group, a second set of one or more PMIs associated to the second resource or port-group, a first layer indicator (LI) associated with the first set of PMIs, and a second LI associated with the second set of PMIs.

28. The apparatus of claim 27, wherein the transmission scheme comprises one of: spatial division multiplexing (SDM) or time division multiplexing (TDM).

29. The apparatus of claim 27, wherein the transmission scheme comprises frequency division multiplexing (FDM) and wherein:
the first CSI measurements are performed based on the first CSI-RS resource or port group received on a first set of frequency domain (FD) units; and
the second CSI measurements are performed based on the second CSI-RS resource or port group received on a second set of FD units.

30. The apparatus of claim 27, wherein:
the first LI indicates a strongest layer among layers indicated by the first set of PMIs; and
the second LI indicates a strongest layer among layers indicated by the second set of PMIs.

* * * * *